United States Patent
Maksimenko et al.

(10) Patent No.: US 12,505,081 B1
(45) Date of Patent: Dec. 23, 2025

(54) QUERY PROCESSING USING MIN/MAX DECISIVE ROW POSITIONS

(71) Applicant: Snowflake Inc., Bozeman, MT (US)

(72) Inventors: Dmitrii Maksimenko, Berlin (DE); Noble Mushtak, San Mateo, CA (US); Ankur Sharma, Berlin (DE); Malek Souissi, Berlin (DE); Lars Volker, Los Altos, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/246,952

(22) Filed: Jun. 24, 2025

(51) Int. Cl.
*G06F 16/21* (2019.01)
*G06F 16/215* (2019.01)
*G06F 16/23* (2019.01)

(52) U.S. Cl.
CPC .......... *G06F 16/219* (2019.01); *G06F 16/215* (2019.01); *G06F 16/235* (2019.01); *G06F 16/2365* (2019.01)

(58) Field of Classification Search
CPC .... G06F 16/219; G06F 16/215; G06F 16/235; G06F 16/2365; G06F 16/23
See application file for complete search history.

(56) References Cited

U.S. PATENT DOCUMENTS 10,474,650 B1 * 11/2019 Sivathanu ............. G06F 16/953
11,138,175 B2 * 10/2021 Arye ..................... G06F 16/113

* cited by examiner

*Primary Examiner* — Maher N Algibhah
(74) *Attorney, Agent, or Firm* — Schwegman Lundberg & Woessner, P.A.

(57) ABSTRACT

The subject technology provides modifying data in a partition stores a version identifier and a set of physical row positions in a header, including minimum and maximum value occurrences for each column. When a query to modify data is received, the subject technology determines which rows to modify, checks eligibility for skipping partition scanning, and compares the to-be-modified positions with the stored positions. If no stored positions are modified, the subject technology skips scanning and maintains existing statistics, and creates a new combined partition without recalculating statistics. If modifications are made, the subject technology evaluates eligibility for processing using delta files and a bitset, or performs a copy-on-write process if ineligible.

20 Claims, 15 Drawing Sheets

QUERY PROCESSING USING MIN/MAX DECISIVE ROW POSITIONS

TECHNICAL FIELD

Embodiments of the disclosure relate generally to cloud data platforms and, more specifically, to implementations of Data Manipulation Language (DML) for SQL (Structured Query Language) used to manage and manipulate data within a database system(s), and the like.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

A data platform may store database data (e.g., a table) in multiple storage units, which may be referred to as partitions, micro-partitions, and/or by one or more other names. A database may be organized as records (e.g., rows or a collection of rows) that each include one or more attributes (e.g., columns). In an example, multiple storage units of a database can be stored in a block and multiple blocks can be grouped into a single file. That is, a database can be organized into a set of files where each file includes a set of blocks, where each block includes a set of more granular storage units such as partitions. It should be understood that the terms "row" and "column" are used for illustration purposes and these terms are interchangeable. For example, data arranged in a column of a table can similarly be arranged in a row of the table.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In modern database systems, performing data modification operations efficiently while maintaining accurate statistics is a critical challenge. When executing DELETE, UPDATE, or MERGE operations that modify only a small fraction of rows across multiple partitions, traditional approaches require scanning and rewriting large amounts of unchanged data, leading to significant performance overhead.

The subject system implements techniques using min/max decisive row positions stored in a file header, which enables determining whether column statistics need to be recomputed without scanning the entire partition. This optimization enables significant performance improvements for queries as discussed further herein, while maintaining the accuracy of critical metadata statistics.

In an implementation, the subject technology achieves these performance improvements by storing a compact set of physical row positions in the partition header. More specifically, the subject technology provides tracking of one position for an occurrence of the minimum value and one for the maximum value for each column. When performing data modifications, the subject system can determine whether these statistics need to be recomputed simply by checking if any of the tracked positions are being modified, rather than scanning all data. This approach is particularly effective for operations that modify less than a threshold percentage (e.g., 5%, and the like) of rows in a partition.

Figure 1:
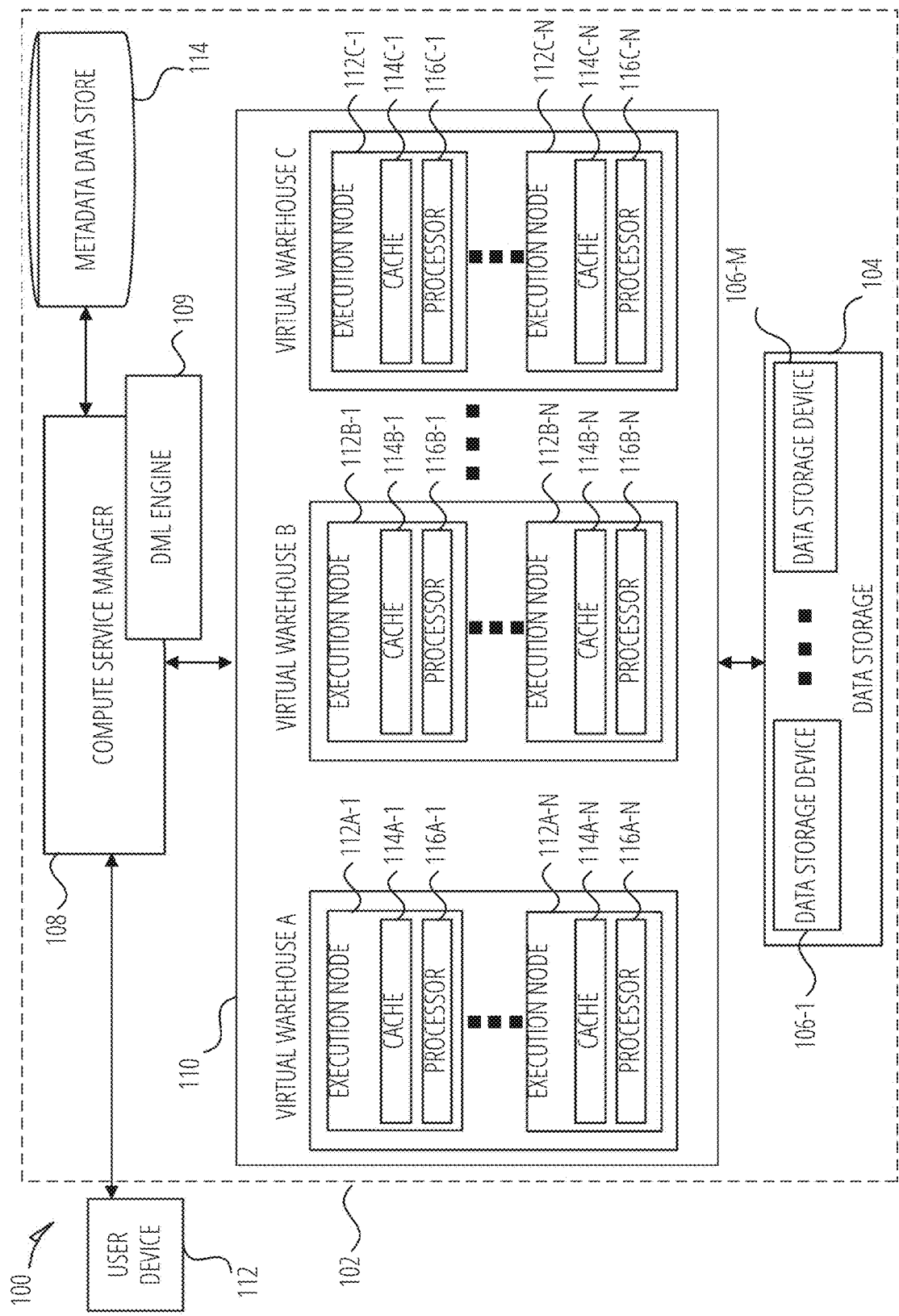
FIG. 1 illustrates an example computing environment that includes a data platform, in accordance with some embodiments of the present disclosure.

FIG. 1 illustrates an example computing environment 100 that includes a data platform 102, in accordance with some embodiments of the present disclosure. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the computing environment 100 to facilitate additional functionality that is not specifically described herein.

As shown, the data platform 102 comprises a three-tier architecture: a compute service manager 108 coupled to a metadata data store 114, an execution platform 110, and data storage 104. The data platform 102 hosts and provides data access, management, reporting, and analysis services to multiple client accounts. Administrative users can create and manage identities (e.g., users, roles, and groups) and use permissions to allow or deny access to the identities to resources and services. The data platform 102 is used for reporting and analysis of integrated data from one or more disparate sources including storage devices within the data storage 104. The data storage 104 comprises a plurality of computing machines and provides on-demand computer system resources such as data storage and computing power to the data platform 102.

The compute service manager 108 includes multiple services that coordinate and manage operations of the data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata data store 114. The metadata data store 114 stores metadata pertaining to various functions and aspects associated with the data platform 102 and its users. The metadata data store 114 also includes a summary of data stored in data storage 104 as well as data available from local caches. Additionally, the metadata data store 114 includes information regarding how data is organized in the data storage 104 and the local caches.

As shown, the compute service manager 108 includes a DML engine 109 that is responsible for performing operations related to improving DML queries, including at least generating and maintaining delta files, bitsets, and related metadata, as discussed further herein. Further details of the operation of the DML engine 109 are discussed below.

The compute service manager 108 is also in communication with a user device 112. The user device 112 corresponds to a user of one of the multiple client accounts supported by the data platform 102. In some implementations, the compute service manager 108 does not receive any direct communications from the user device 112 and only receives communications concerning jobs from a queue within the data platform 102.

The compute service manager 108 is also coupled to the metadata data store 114. The metadata data store 114 stores metadata pertaining to various functions and aspects associated with the data platform 102 and its users. The metadata data store 114 also includes a summary of data stored in data storage 104 as well as data available from local caches. Additionally, the metadata data store 114 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes that each includes a data cache and a processor. For example, as shown, virtual warehouse A includes execution node 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution node 112B-1 to 112B-N; execution node 112B-1 includes a cache 114B-1 and a processor 116B-1; and execution node 112B-N includes a cache 114B-N and a processor 116B-N. Additionally, virtual warehouse C includes execution node 112C-1 to 112C-N; execution node 112C-1 includes a cache 114C-1 and a processor 116C-1; and execution node 112C-N includes an execution node 112C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Figure 2:
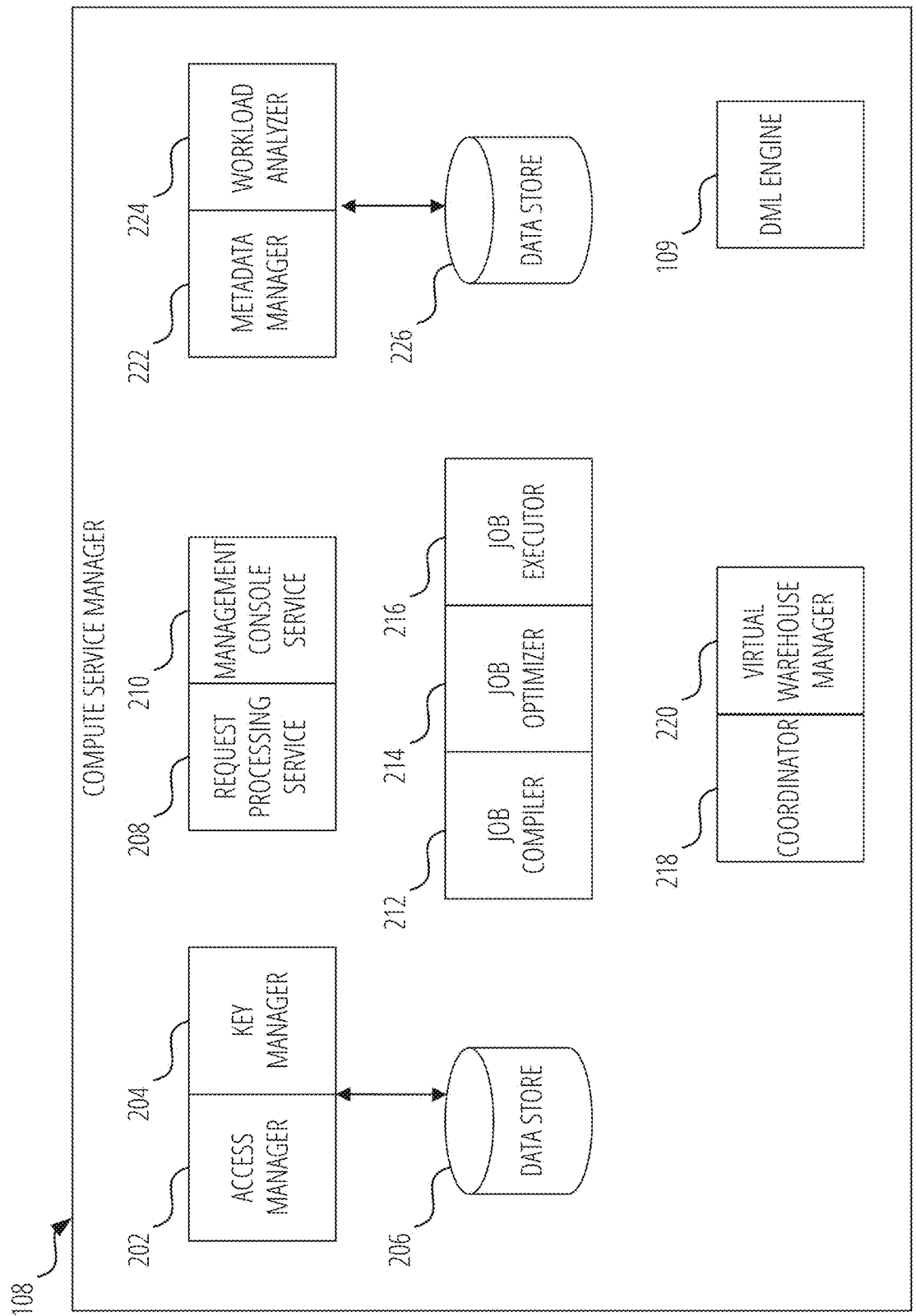
FIG. 2 is a block diagram illustrating components of a compute service manager of the cloud data platform, in accordance with some embodiments of the present disclosure

Although each virtual warehouse shown in FIG. 2 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 2 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems (HDFS)), object storage systems, and the like. In some examples, the data storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 2. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 2 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 2, the data storage devices 106-1 to 106-M are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

The compute service manager 108, metadata data store 114, execution platform 110, and data storage 104 are shown in FIG. 2 as individual discrete components. However, each of the compute service manager 108, metadata data store 114, execution platform 110, and data storage 104 may be implemented as a distributed system (e.g., distributed across multiple systems/platforms at multiple geographic locations). Additionally, each of the compute service manager 108, metadata data store 114, execution platform 110, and data storage 104 can be scaled up or down (independently of one another) depending on changes to the requests received and the changing needs of the data platform 102. Thus, in the described embodiments, the data platform 102 is dynamic and supports regular changes to meet the current data processing needs.

As mentioned further herein, terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file includes a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, the metadata data store 114 includes EP files (expression property files), where each of the EP files store a collection of expression properties about corresponding data. As mentioned before, EP files provide a similar function to an indexing structure into micro-partition metadata. Metadata may be stored for each column of each micro-partition of a given table.

In an example, a large source table may be (logically) organized as a set of regions in which each region can be further organized into a set of micro-partitions. Additionally, each micro-partition can be stored as a respective file in the subject system in an embodiment. Thus, the term "file" (or "data file") as mentioned herein can refer to a micro-partition or object for storing data in a storage device or storage platform. In embodiments herein, each file includes data, which can be further compressed (e.g., using an appropriate data compression algorithm or technique) to reduce a respective size of such a file.

In some embodiments, metadata may be generated when changes are made to one or more source table(s) using a data manipulation language (DML), where such changes can be made by way of a DML statement. Examples of modifying data, using a given DML statement, may include updating, changing, merging, inserting, and deleting data into a source table(s), file(s), or micro-partition(s).

As shown in FIG. 2, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from, and store data to, any of the data storage resources in the data storage 104.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data store 206 that stores access information. Access manager 202 handles authentication and authorization tasks for the subject systems described herein. Key manager 204 manages storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the subject system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Figure 3:
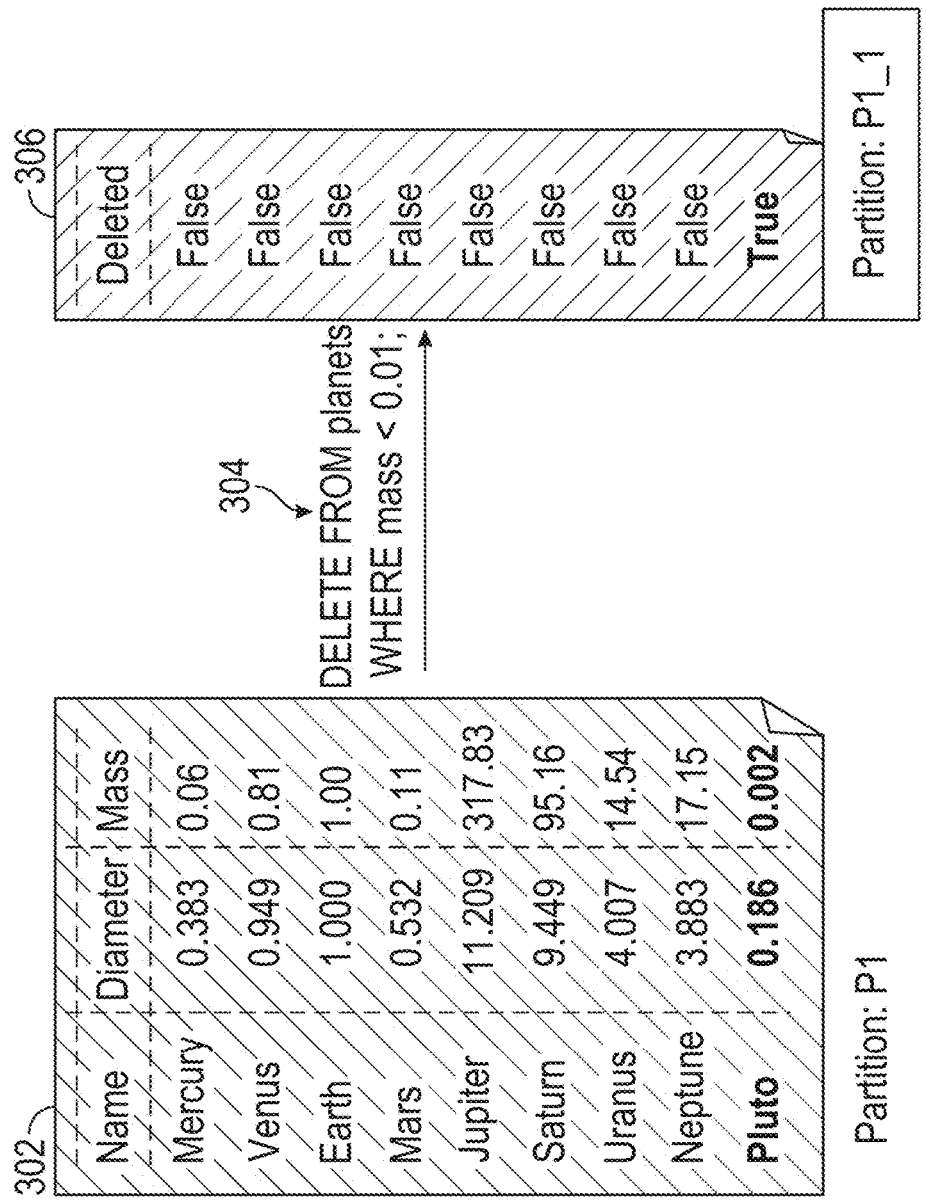
FIG. 3 illustrates an example of performing a delete operation with bitsets, in accordance with an embodiment of the subject technology.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 3 represents any data repository or device within the data platform 102. For example, data store 226 may represent caches in execution platform 110, storage devices in data storage 104, the metadata data store 114, or any other storage device or system.

In addition, as mentioned above, the compute service manager 108 includes a DML engine 109 that is responsible for performing operations related to improving DML queries, including at least generating and maintaining delta files, bitsets, and related metadata, as discussed further herein. Further details regarding the functionality of the DML engine 109 are discussed below.

FIG. 3 illustrates an example of performing a delete operation with bitsets, in accordance with an embodiment of the subject technology. In an implementation, DML engine 109 can perform at least some of the operations discussed below.

In the example of FIG. 3, file 302 is processed in view of query 304, in which the result of this query is represented by bitset 306. As shown, partition P1_1 includes bitset 306. Partition P1 can be understood as a logical concept which includes a set of rows, while a file (e.g., file 302) is stored on a disk or in an object store. In an example, a given partition (e.g., partition P1) can include one or two files.

In an example, file 302 includes data for a table of data including values for name, diameter, and mass, each of which is a separate column in each row of the table.

The subject technology introduces delta files, which are created by DMLs that delete and/or update rows. A delta file is associated with exactly one data file referred to as its root file, and stores the difference to that root file. A root file can have exactly zero or one active delta file, and chains of delta files, therefore, are not created. Instead, subsequent updates will replace an existing delta file with a new one.

The subject technology advantageously provides the following improvements: 1) enabling computing advanced metadata (e.g., number of distinct values, the like), thereby improving read operation performance; 2) integrating bitsets in micro-partition files, thereby enabling leveraging storage management and optimization features such as encryption and caching.

The following discussion relates to a logical layout for a delta file.

Figure 4:
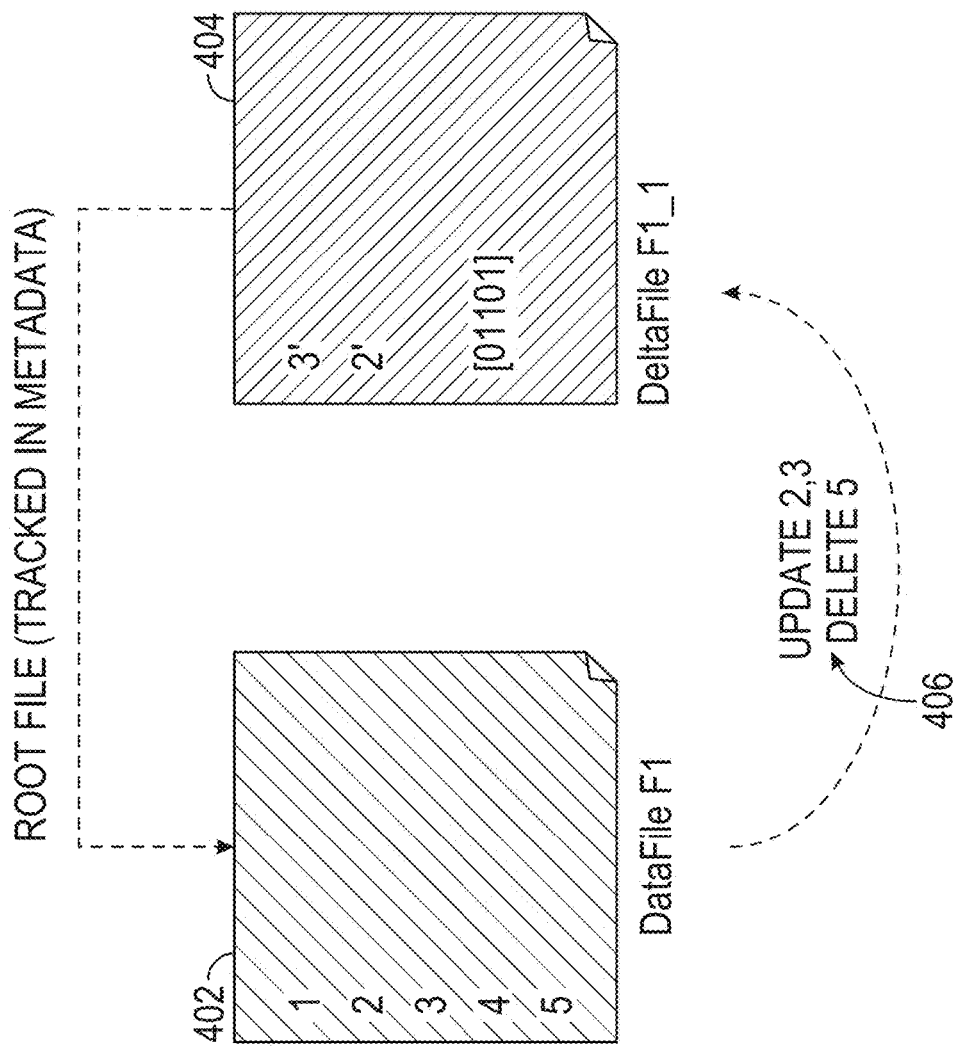
FIG. 4 illustrates an example of a logical layout of a delta file, in accordance with an embodiment of the subject technology.

FIG. 4 illustrates an example of a logical layout of a delta file, in accordance with an embodiment of the subject technology. In an implementation, DML engine 109 can perform at least some of the operations discussed below.

In the example of FIG. 4, root file 402 and delta file 404 are illustrated where delta file 404 is associated with root file 402 based on a set of queries 406 that includes a first query with an update statement and a second query with a delete statement for performing on root file 402. The root file 402, in this example, includes a set of rows, each row having a value (e.g., as included in a column).

In an implementation, a delta file (e.g., delta file 404) stores:
 1. A bitset set to mark rows of its root file as unregistered, i.e., deleted or updated.
 2. Optionally a set of rows that are new versions of updated rows of its root file (e.g., this could be left out if no rows were updated such as in a DELETE statement). The order of the updated rows is not specified, i.e., their original order from the root file is not maintained.

Figure 5:
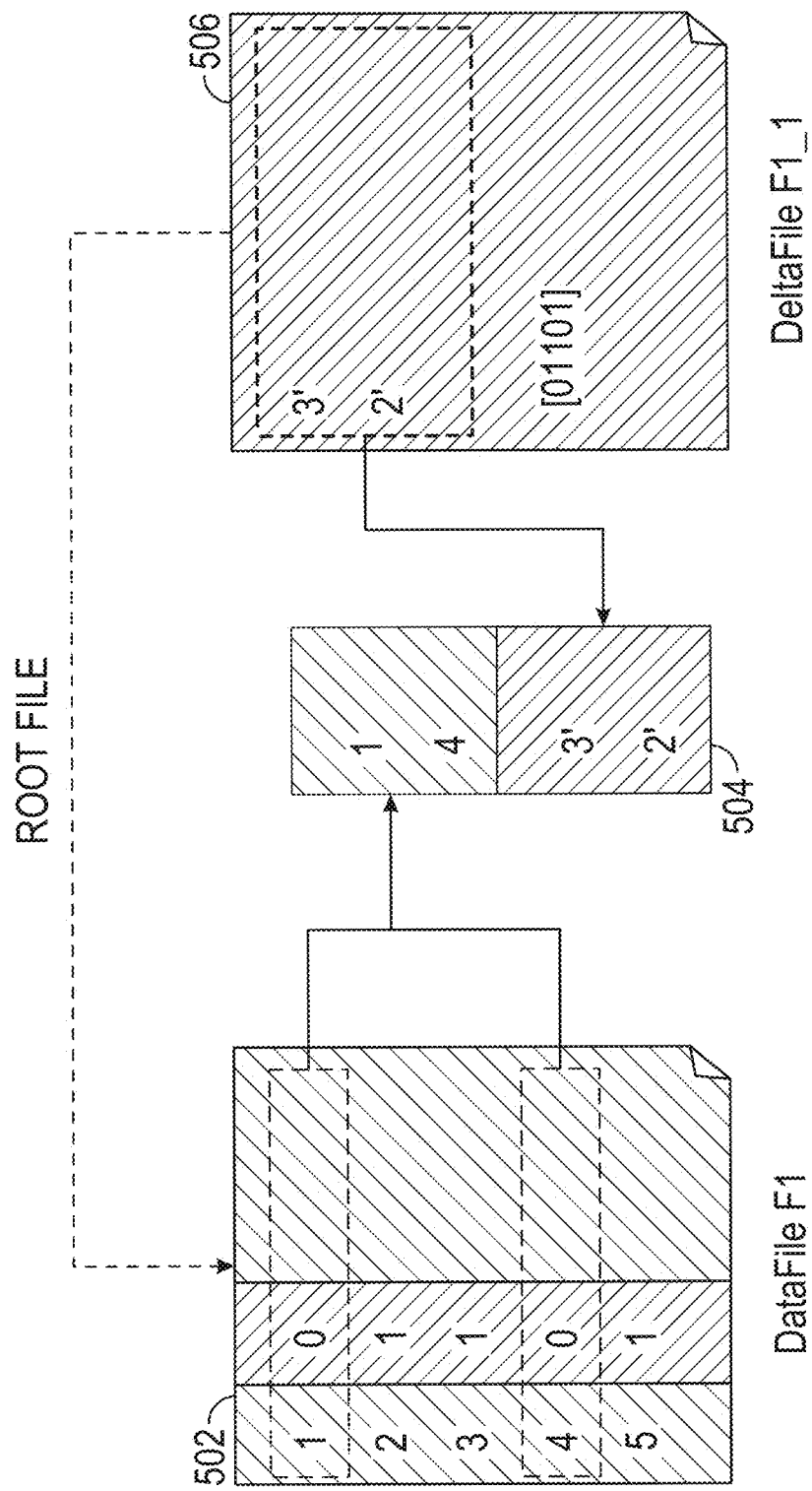
FIG. 5 illustrates an example of producing logical content of a delta file, in accordance with an embodiment of the subject technology.

FIG. 5 illustrates an example of producing logical content of a delta file, in accordance with an embodiment of the subject technology. In an implementation, DML engine 109 can perform at least some of the operations discussed below.

In an implementation, the delta file-to-root file relationship is tracked in metadata (e.g., EP metadata and the like) and not in the delta file, at least because physical file names are not fixed (e.g., can change in view of performing rekeying, replication). In the example of FIG. 5, a root file of delta file 506 corresponds to data file 502.

Since the delta file stores the differences from its root file, the combined partition, which includes the delta file combined with the root file, includes the same data as a data file that was created using a copy-on-write mechanism. Copy-on-write (CoW) refers to a data processing technique such that when a database needs to modify data (e.g., as part of executing a given query), instead of modifying the existing data, CoW creates a new copy of the data (e.g., table, partition, file, and the like) with the modifications.

The logical content of a delta file, such as logical content 504, can be constructed by scanning its root file and filtering the rows using the delta file's bitset and scanning the delta file's updated rows.

In an example, a combined partition includes the rows that are obtained by applying the delta file on top of the root file, i.e. it can include one file (root file only) or two files (root+delta). As mentioned herein, a combined partition is one that includes the two files, and a regular partition (or simply "partition") is one that is understood to only include one file (e.g., root file only).

Figure 6:
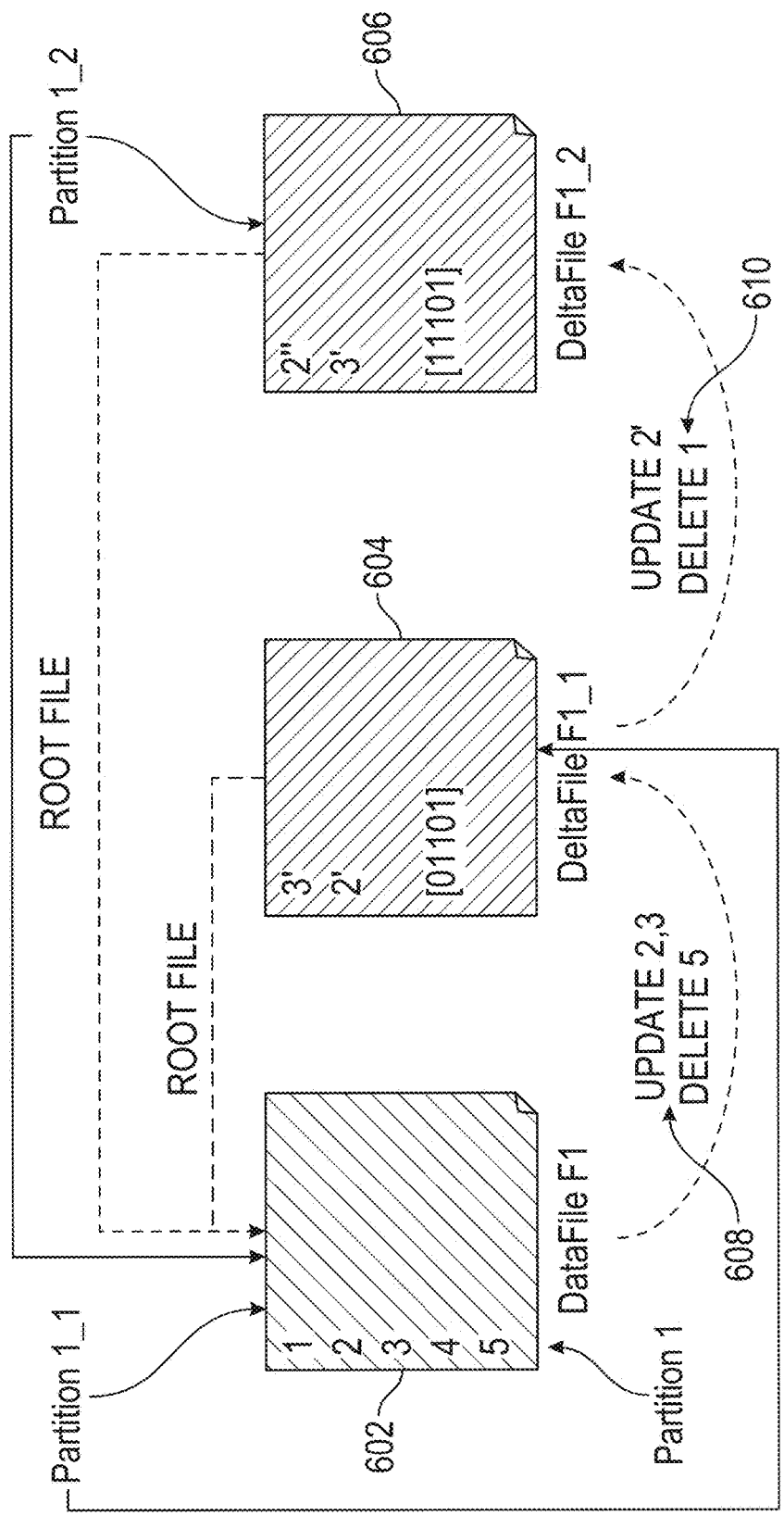
FIG. 6 illustrates an example of producing a delta file, in accordance with an embodiment of the subject technology.

FIG. 6 illustrates an example of producing a delta file, in accordance with an embodiment of the subject technology. In an implementation, DML engine 109 can perform at least some of the operations discussed below.

In FIG. 6, query 608 is executed on data file 602 to generate delta file 604. Subsequently, delta file 606 is generated based on query 610 being processed on the partition including root file (e.g., data file 602) and delta file 604.

A delta file (e.g., delta file 606) can be produced when a DML statement(s) (e.g., query 610) deletes or updates rows that are (logically) contained in a delta file (e.g., delta file 604). The new delta file (e.g., delta file 606) will inherit the root file, the bitset, and all updated rows from the updated delta file and apply all additional changes of the current DML on top, i.e., it can mark additional rows in the bitset and store additional updated rows. Updated rows of the updated delta file that are not modified are copied forward into the new delta file, resulting in a CoW-like update behavior between two delta files. These delta files (e.g., delta file 604 and delta file 606) are referred to further herein as stacked delta files.

As illustrated, a first partition (e.g., partition 1) includes data file 602, a second partition (e.g., partition 1_1) includes data file 602 and delta file 604, and a third partition (e.g., partition 1_2) includes data file 602 and delta file 606.

The following discussion relates to partition alignment.

The layout and validation approach of delta files relies on DMLs to produce exactly one new partition for each partition that is unregistered (due to rows to delete or update). Moreover, the row boundaries of the new partition must be fully aligned with the unregistered partition, i.e., all unchanged and updated rows of an unregistered partition must be contained in the same new partition.

In an implementation, DELETE, UPDATE, and MERGE execution plans (e.g., query plans) do not provide such guarantees because such execution plans can leverage techniques such as insert-funneling and small-file garbage collection to produce optimal-sized files. In an example, insert funneling involves aggregating multiple small insert operations into larger, batched inserts to reduce network overhead and improve overall throughput. Due to these techniques, rows from the same unregistered partition can be spread across multiple new partitions and a new partition can contain rows from multiple unregistered files.

The following discussion relates to a physical layout.

In an implementation, delta files are encoded as micro-partition files. Bitsets are stored in the variable part of the header as compressed objects and the updated rows in the micro-partition data section. The bitsets are encoded using a bitmap encoding scheme (e.g., compressed bitmap, and the like) and versioned so that the representation of the bitsets can be changed.

The following discussion relates to a read path, which may be implemented, at least in part, by DML engine 109 or when a given DML query is being executed by a given execution node.

A combined partition is represented by a delta file and a root file and is uniquely identified by the name of the delta file. Its logical content differs from its physical representation in both root and delta files and its metadata information describes its logical content. Hence, scanning a combined partition produces the logical content and is referred to herein as an operation called a combined partition scan.

In an example, combined partitions (e.g., with 2 files as mentioned above) are registered and unregistered similar to regular partitions (except that additional metadata is stored for delta and root files) and regular partitions are unregistered by DMLs. Since EP information (e.g., metadata information) for combined partitions is based on their logical content, the pruning mechanism and other inference methods of the optimizer do not need to be adjusted. In an implementation, a cache for EP information introduces changes to abstract tuples of delta and root files as a combined partition for the compiler.

A scanset entry for a combined partition differs from the entry of a regular partition because it includes access information for the delta file and its root file, i.e., two filenames, volume IDs, encryption prefixes, file master keys. The file access information for the root file is stored together with the access information for the delta file in EP files to avoid additional lookups during scanset generation. Combined partitions will be assigned to execution node workers based on the assignment of their root file to improve cache efficiency.

In an implementation, EpScan and ScanSetBuilder RSOs can be used to generate scan sets in a given execution node, which is utilized for regular non-DML queries in an example. For example, EPScan provides, as output, information to read a combined partition of a root file and delta file to the ScanSetBuilder in the execution node. In an implementation, reading the required fields from the EP file, adding them to the intermediate variant, and then passing them into a ScansetIt inside a ScanSetBuilder is provided to support the embodiments described herein.

Another occurrence might be the growth of the scanset due to the doubling of file metadata required to scan a combined partition. One approach to mitigate this would be to reduce the threshold for switching to EP-based scans, which will reduce the scanset that is sent from compute service manager 108 to a given execution node.

In an implementation, scan set pipelining can be utilized to enable processing input partitions in smaller batches.

Adding more information to scan sets will increase their memory usage and therefore increase the risk of OOMs (e.g., out of memory) errors. Scanning delta files when the TableScan operator retrieves a scanset entry describing a combined partition, DML engine 109 (or given execution node in another implementation) performs a combined partition scan to produce the logical content of the partition. The combined partition scan is performed based on the following.

Scanning unchanged rows from the root file: In order to scan the non-updated and non-deleted rows from the root file, the rows of the root file are filtered using the delta file's bitset. First, the delta file is opened and the header and bitset are read. Then, the root file is opened and rows are scanned while applying the bitset. The bitset filter evaluation can be combined with the evaluation of pushed-down predicates and produce a single selection vector. In an implementation, pushed-down predicates of the query are extended with a predicate on the bitset pseudocolumn to filter out all rows that were marked as deleted or updated. All predicates are evaluated together resulting in a single selection vector that selects rows that passed the query predicates and the delta file bitset in an example.

In an example, scanning a partition now accesses up to two files. However, an increased hit ratio for the local warehouse cache can be expected because root files will remain valid for longer and do not need to be fetched again when a new delta file is produced.

In an implementation, scanning of a delta file is performed by 1) opening a delta file, 2) retrieving a bitset, and 3) closing the file. In an implementation, scanning of a root file is performed by 1) opening the root file, and 2) commencing scanning and applying the bitset.

Figure 7A:
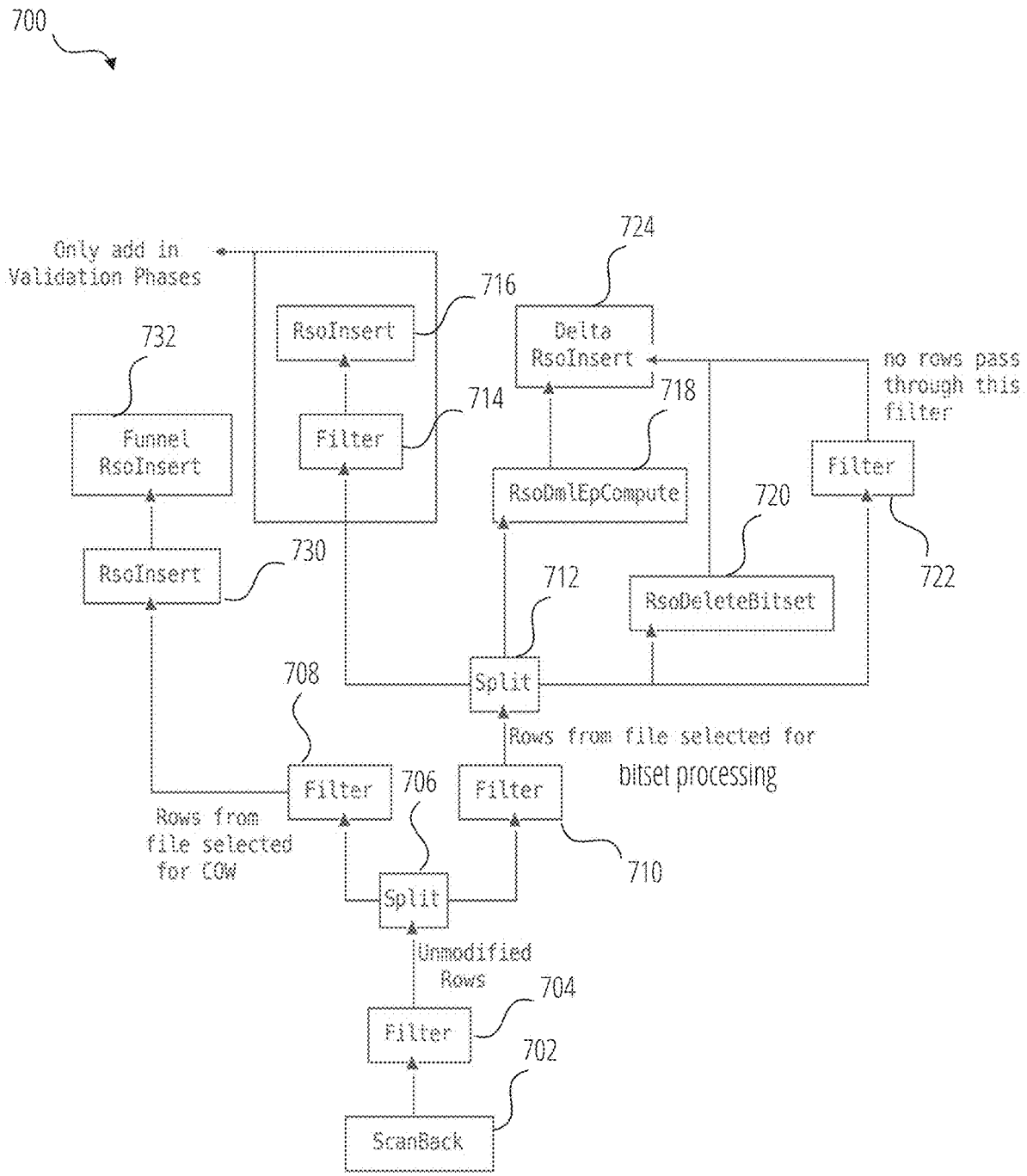
FIG. 7A illustrates an example of a query plan in accordance with an embodiment of the subject technology.

FIG. 7A illustrates an example of a query plan 700 in accordance with an embodiment of the subject technology.

A resulting high-level plan is illustrated in query plan 700 for a given query that performs a delete operation on a given table. In an embodiment, DML engine 109 can generate, at least in part, query plan 700.

As illustrated, query plan 700 includes a set of operators for a DML operation(s) related to a delete operation on a table. A scanback operator 702 that reads the entire micro-partition (e.g., all of the rows) where the delete operation will be performed. A filter operator 704 filters out a set of rows from the table that are to be deleted, leaving a set of unmodified rows that are received by split operator 706.

In this example, a split operator 706 sends a first copy of the set of unmodified rows to filter operator 708 on the left side of query plan 700, and also sends a second copy of the set of unmodified rows to filter operator 710 on the right side of query plan 700. When the subject system determines that a CoW process is to be performed for the DML operation, the left side of the query plan (e.g., starting with filter operator 708) is processed, and filter operator 710 filters out the set of unmodified rows from the right side of query plan 700. When the subject system determines that the approach using a bitset is to be performed for the DML operation, the right side of the query plan (e.g., starting with filter operator 710) is processed and filter operator 708 filters out the set of unmodified rows from the left side of query plan 700. The left side of query plan 700 also includes RSO insert operator 730 and funnel RSO insert operator 732, which result in the CoW file being written when the CoW process is performed (mentioned above).

For writing a delta file, split operator 712 sends a copy of the set of unmodified rows to a set of operators including RSO DML EP compute operator 718 (e.g., computes the EP metadata for the set of unmodified rows and sends them to delta RSO Insert Operator 724), RsoDeleteBitset operator 720 (e.g., creates the bitset indicating which rows are deleted from the micro partition based on the set of unmodified rows and sends the bitset to delta RSO Insert Operator 724), delta RSO Insert Operator 724 (e.g., writes the delta file with the received EPs and delete bitsets, and send it the file registration information to the compute service manager 108), and filter operator 722 (e.g., no rows are passed through this filter). In validation phases, split operator 712 also sends a copy of the set of unmodified rows to filter operator 714, which sends the unmodified rows to the RsoInsert operator 716 for writing a validation file (e.g., CoW file).

Figure 7B:
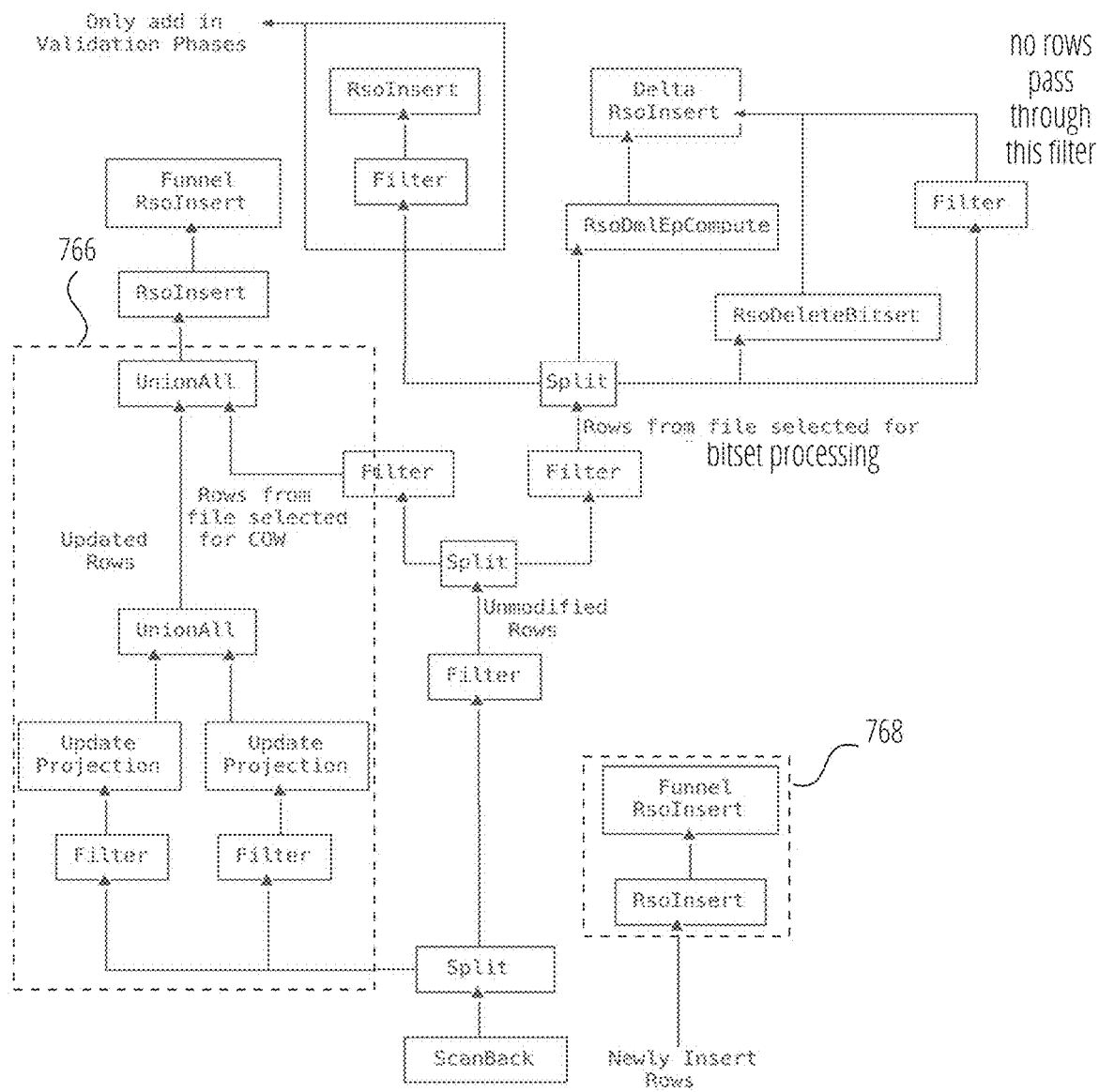
FIG. 7B illustrates an aspect of the subject matter in accordance with one embodiment.

FIG. 7B illustrates an example of a query plan 740 in accordance with an embodiment of the subject technology.

A resulting high-level plan is illustrated in query plan 740 for a given query that performs a DML operation(s) related to a merge operation on a given table. In an embodiment, DML engine 109 can generate, at least in part, query plan 740.

As illustrated, query plan 740 includes a set of operators for a merge operation. Portions of query plan 740 include similar operators to those discussed in connection with FIG. 7A above, and such operators will not be discussed below for the sake of clarity and to avoid repetition in the discussion.

In this example, a set of updated rows is sent to a portion of query plan 740, including a set of operators 766 corresponding to the left side of query plan 740. A right side of query plan 740 includes at least some of the same operators as those discussed before in FIG. 7A, and in this example, such operators process a delete operation using unmodified rows from the table (e.g., rows that have neither been deleted nor updated).

As also shown, for newly inserted rows, another portion of query plan 740 includes a set of operators 768 for processing a set of newly inserted rows.

Figure 7C:
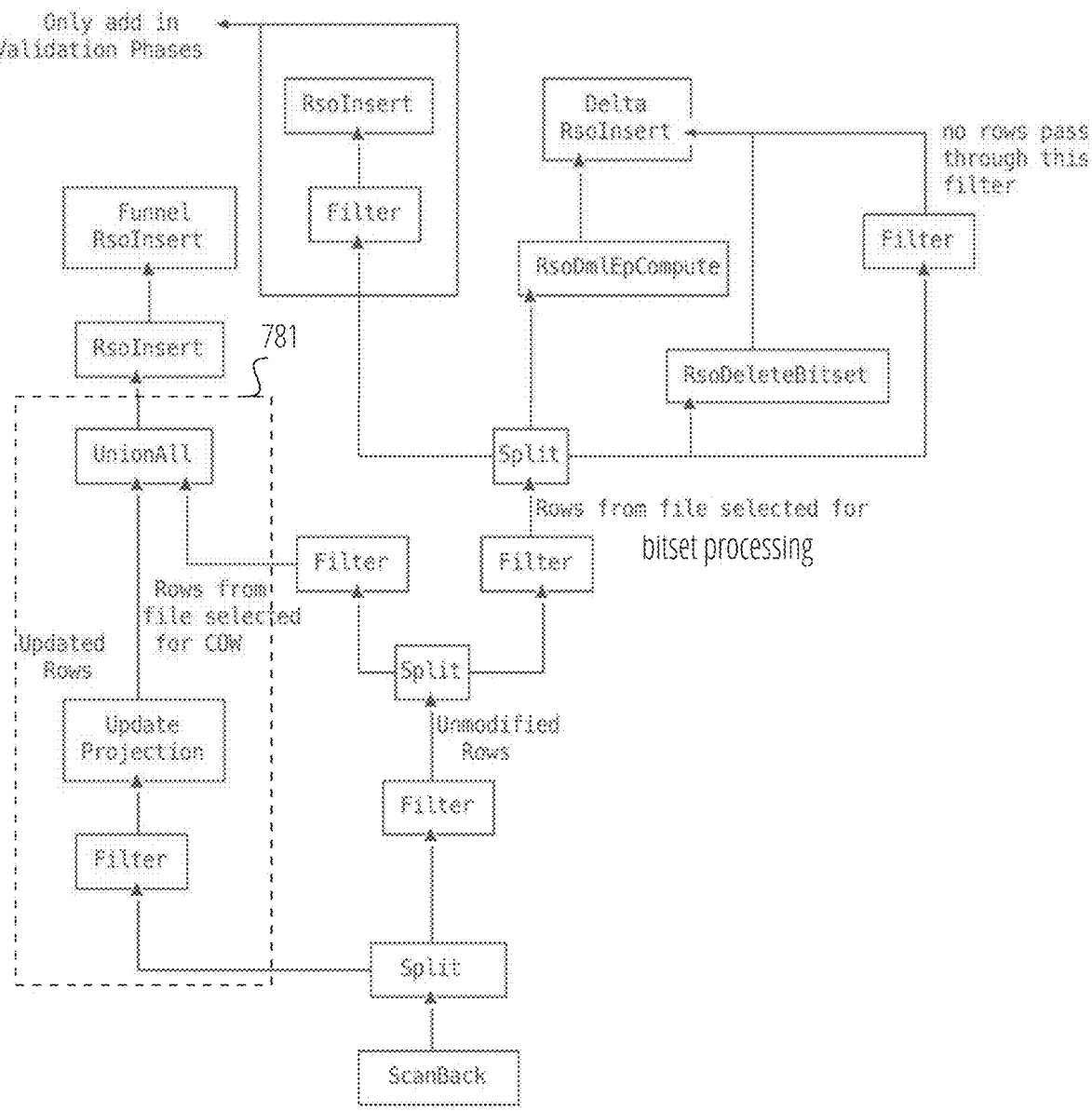
FIG. 7C illustrates an aspect of the subject matter in accordance with one embodiment.

FIG. 7C illustrates an example of a query plan 780 in accordance with an embodiment of the subject technology.

A resulting high-level plan is illustrated in query plan 780 for a given query that performs a DML operation(s) related to an update operation on a given table. In an embodiment, DML engine 109 can generate, at least in part, query plan 780.

As illustrated, query plan 780 includes a set of operators for an update operation. Portions of query plan 780 include similar operators to those discussed in connection with FIG. 7A and FIG. 7B above, and such operators will not be discussed below for the sake of clarity and to avoid repetition in the discussion.

In query plan 780, a set of operators 781 includes operators that represent a single update branch.

Each of the aforementioned query plans in FIG. 7A, FIG. 7B, and FIG. 7C includes the others, e.g., MERGE (e.g., query plan of FIG. 7B) has all the elements of UPDATE (e.g., query plan of FIG. 7C), which includes everything (e.g., each operator) from DELETE (e.g., query plan of FIG. 7A).

The following discussion relates to an execution node (e.g., execution node 112A-1, and the like), and particular operations that such an execution can perform with respect to embodiments of the subject technology. In particular, references to various operators or operations can be understood as being performed by the execution node (e.g., during query execution, and the like).

For a combined partition scan, at the bottom of a given query plan, an execution node performs a scan of the partition. The scan produces data rows together with a set of provenance columns including the physical row number in their file. In addition to the columns that the execution node produces, the execution node adds a new Boolean B/D provenance pseudocolumn which identifies whether a row originated from the base or delta file. The execution node also adds file access metadata columns for the base file if the scanned file is a delta file: BASE_VOL_ID, BASE_ENC_PREFIX, BASE_FILE_ID, BASE_FMK_ID. These columns can be utilized in the scanback operator to rescan the combined partition. In an example, a pseudocolumn is a column that is not physically stored in a table, appears as a regular column in queries, and is generated by to provide additional information or functionality when querying data.

The current validation mode determines how the scan will read the rows. When in a validation phase, then it will produce rows from the validation file, which will also contain a bitset for the B/D column. After the validation phase, it will read rows from the base and delta file and populate the B/D bitset based on which file a row was read from.

In an example, a ROW_POS column (e.g., indicating row position) will include the physical row position in the file that is read from.

An intermediate plan of the DML statement includes joining of the source tables for MERGE statements, the filter to pass rows that are being deleted or updated and the projection to annotate rows with their route ID and insert flag. Newly inserted rows for MERGE statements will be split out to a separate insert operator. An optional POBY operator will order rows by (row-offset, B/D flag) to make sure that all rows appear in the order in which the scanback will process them (base file row first, then delta rows).

With respect to a scanback operator (or "scanback operation"), before scanning a new file back, the scanback operator will buffer input rows to be updated. If the number of rows exceeds a configurable threshold, the operator will decide to perform a copy-on-write operation for the current file. In an example, memory utilization to buffer input rows relatively small at least because the buffer is cleared for each file and the scanback receives metadata (file_name, row_pos, vol_id, route_flag, and the like) and no actual table data.

The scanback operator will unregister the input file. If the scanback operator encounters a delta file, then it will unregister the combined partition that represents the delta file.

Next, the scanback operator will open the input partition and send a START_OF_FILE signal containing the number of rows in the source file. The Insert operator will use this signal to decide whether to wait for the remaining rows or to finalize a file if its internal statistics indicate that the current file should be finalized but only a small number of rows are outstanding.

To open the file for scanning it back, the operator will use the base and virtual provenance columns from the incoming row set. The partition scan will produce physical row numbers and the B/D information in provenance columns.

At the end of an input file, the scanback operator will send a flush signal, which will include the file metadata for the base and delta micro-partition file, so that the Insert node can send them to compute service manager 108 during file registration. In particular, it will include the full metadata for the base file to include it in the registration request for the combined partition. The flush signal will be sent over the row-output-link of the scanback RSO.

Prior to an insert operator, rows flow through multiple branches of a MERGE statement to filter out deleted rows and apply updates. The insert operator is responsible for computing the bitset, computing the EPs for the partition, writing out the delta file, and registering the file with compute service manager 108.

For bitset computation, an insert RSO will compute the bitset for the new delta file from the input rows. For each row that originated from the base file and which has not been modified by the DML statement, it will set the corresponding bit to 0. All other bits will be set to 1. It can determine whether a row has been updated by looking at the route ID for unmodified rows.

With respect to EP computation, the insert operator will receive all rows including the CoW rows from the base file. Then the insert operator passes these rows to the ColDataContainers to compute EPs. This enables obtaining precise EPs for the combined partition represented by the base and delta files.

With respect to writing micro-partition files, the insert operator will mark rows flowing into the ColDataContainers to indicate whether they need to be considered only for EP computation or whether they should also be written into the final file. When writing files for validation or when scanback decides on a CoW, the insert operator indicates to the ColDataContainers that all rows should be written to the file.

In an example, a row is written to the output file if any of the following hold true:
  The row was updated in the current statement
  The row has been updated before, i.e. it came from the delta file (whether it is being updated in the current statement or not)
  Scanback decided on a copy-on-write fallback A file registration request for a combined partition will include the metadata of both base and delta files in the registration message. In an implementation, caching of the base file metadata in compute service manager 108 is performed, and referring to the file metadata in the registration message is performed (e.g., instead of sending the file metadata to the execution node in the SDL and then sending it back to compute service manager 108 during registration).

A CoW fallback provided in the execution node will support falling back to the old copy-on-write mechanism. At multiple points in the execution, it can be decided whether to fall back to CoW. In particular, the following cases are supported:
  1. The ratio of deleted rows in the final delta file over all rows in the source file exceeds a configurable threshold. In those cases, CoW would be cheaper than then writing a delta file, and subsequent reads would be faster, too.
  2. The size of the source micro-partition file is smaller than a threshold: adding a bitmap will significantly degrade read performance.
  3. The delta file would exceed the maximum file size allowed for the table. Because of a need to maintain a 1:1 mapping between source and delta files, a fall back to CoW is performed to write two new, smaller source files. Exceeding the file size limit by a small fraction can be allowed if only a small number of rows are outstanding.
  4. The resulting file size for a CoW file is smaller than a configurable threshold. This could happen if a delete of a few large rows leads to a small residue. This can be detected by tentatively writing a CoW file and inspecting its size.

In view of the above, cases 1 and 2 can be decided by the scanback operator and will be more common than case 3. They will be handled by switching the insert operator into CoW mode using the START_OF_FILE signal before sending rows to it. Then, the insert operator will write all rows to the output file, including the CoW rows from the base file. Further, for MERGE statements, CoW rows are sent to the insert RSO which handles newly inserted rows.

Case 3 mentioned above may occur if the insert operator detects that the resulting file will exceed a configurable limit and the number of outstanding rows is too large to fit into the allowable size increase. This may happen when compression of a column degrades significantly. To handle it, the insert operator will flush the current file and not write its bitset. Once all updated rows have been written to multiple files, the insert operator will rescan the base file and apply the delete bitset. This will produce exactly the rows that are missing for a full copy-on-write step.

The following discussion relates to validation.

To validate whether a result is correct (e.g., from a given query), the execution node writes an additional validation file together with the delta file. This means that during validation, three files are involved: the base file, delta file, and validation file. The validation file includes the full result of applying the query to the base file, both modified and unmodified rows, as it does today.

Figure 8:
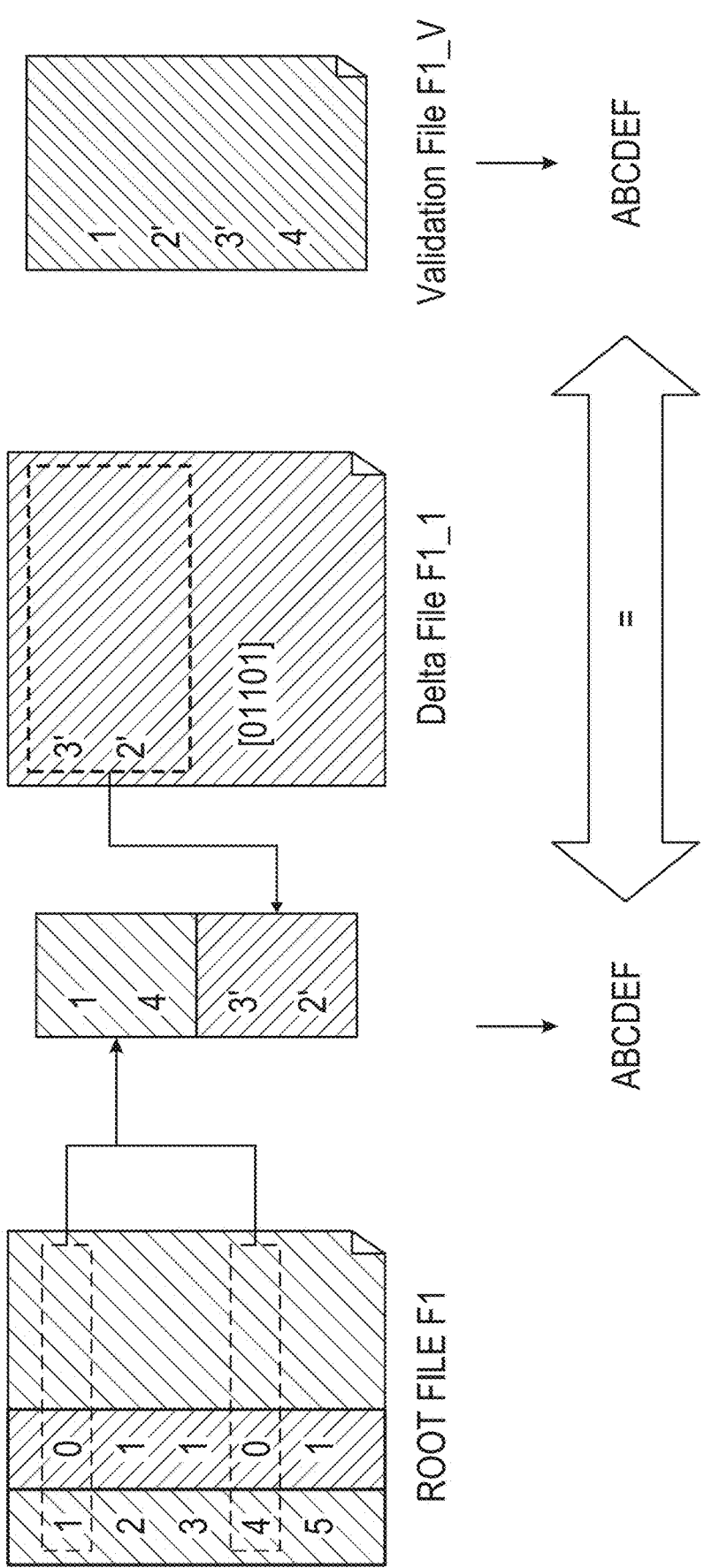
FIG. 8 illustrates an example of background validation, in accordance with an embodiment of the subject technology.

FIG. 8 illustrates an example of background validation, in accordance with an embodiment of the subject technology. Such background validation can be performed by compute service manager 108 in an implementation, or in an implementation at least a portion is performed by a given execution node.

In an implementation, a Data Consistency Service (DCS) performs a background check for combined partitions. The DCS may be provided by compute service manager 108, such as being provided as part of DML engine 109 in an example, or as a separate component of compute service manager 108 in another example. The check will scan combined partitions in two ways, hash the results of both scans, and compare the hashes. The two scan methods are:
  A combined partition scan that reads the base file, filters out rows marked by the delta file's bitset and adds all updated rows of the delta file.
  A regular scan of the validation file. Both scans must produce the same data. An order-independent hashing is utilized to compare the rows from both scans so that the order of the rows does not affect the comparison.

Figure 9:
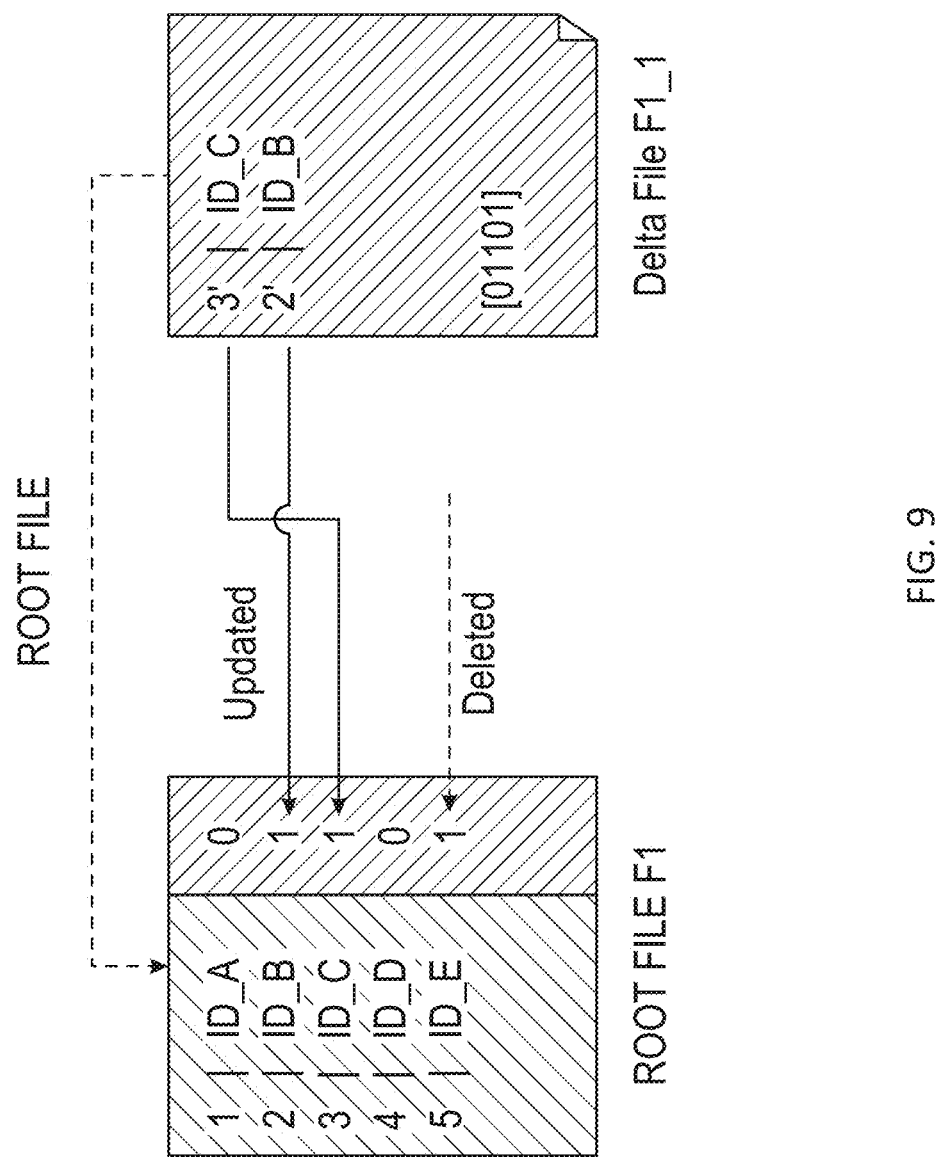
FIG. 9 illustrates an example of change tracking, in accordance with an embodiment of the subject technology.

FIG. 9 illustrates an example of change tracking, in accordance with an embodiment of the subject technology. Such change tracking can be performed by compute service manager 108 in an example. In other implementations, at least some of the operation(s) described below can be performed by a given execution node.

Figure 10:
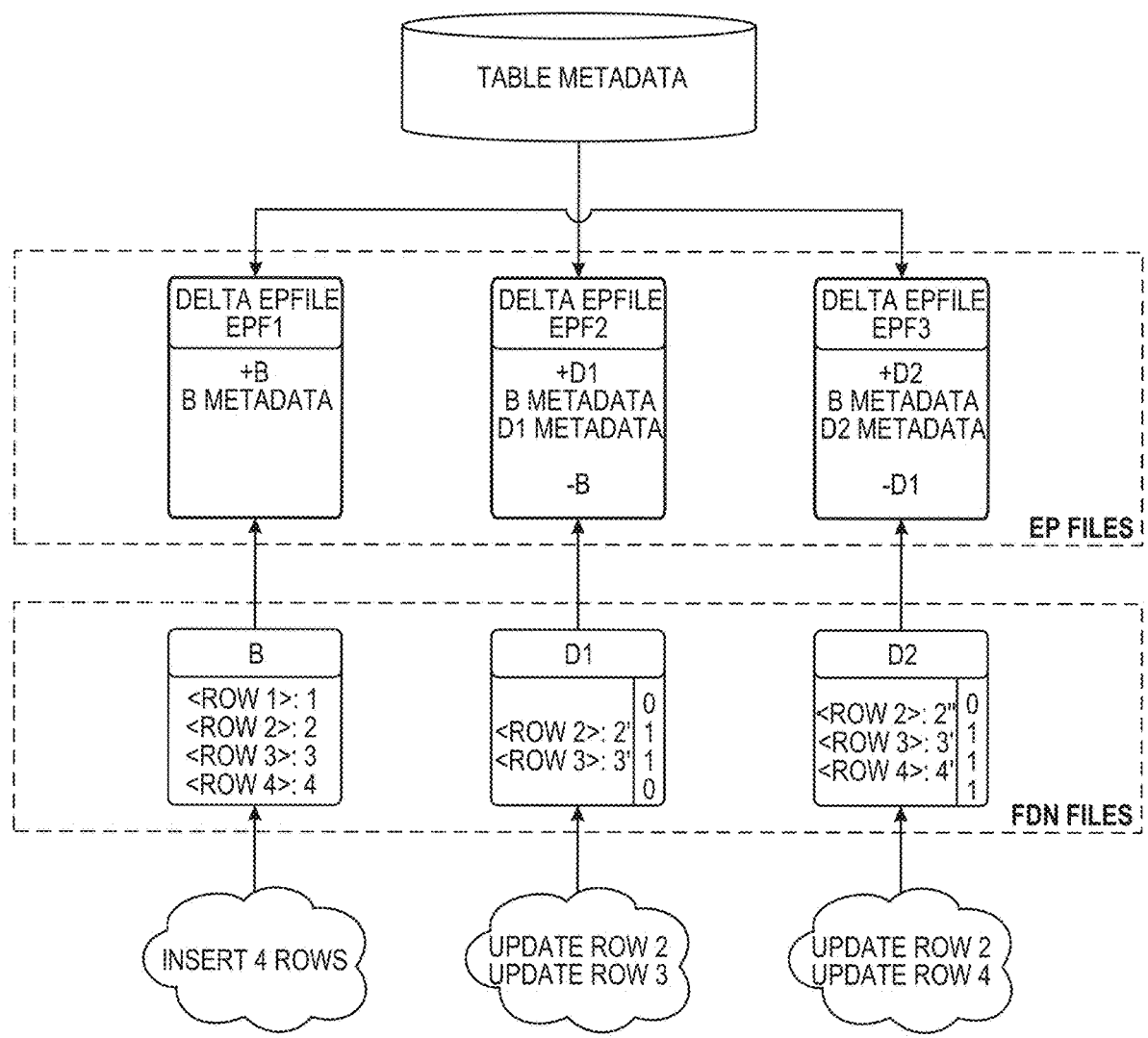
FIG. 10 illustrates an example of metadata, in accordance with an embodiment of the subject technology.

FIG. 10 illustrates an example of metadata, in accordance with an embodiment of the subject technology.

As mentioned before, a combined partition is provided, which is identified by a delta file and includes the rows that are obtained by applying the delta file on top of a root file.

An EP file schema is extended to store file metadata for both root and delta files. EP files store EPs for this combined partition, together with access metadata (volume ID, encryption prefix, FMK ID) and physical file metadata (number of rows, number of bits set in the delete vector, file hashes, etc.) for both files (root+delta).

File registration and unregistration will operate on combined partitions. During an update of a combined partition, a combined partition is unregistered (including metadata for a delta file and a root file) and later registered as a new combined partition, which is represented by a new delta file and the same root file in a new entry in the EP file.

Instead of rewriting the whole micro-partition file, the execution node writes a delta file with a delete bitset that marks the deleted rows. A delta file and a root file have a 1:1 relationship, and delta files are not chained in an example, such that for a subsequent update on the same root file, the previous deleted and updated rows will be carried over to the new delta file. A subsequent update refers to a technique used for multiple changes to a (combined) partition over multiple DML queries From the metadata perspective, a delta file will be registered in an EP file in the same way as micro-partition files but with a reference to the root micro-partition file. The delta file registration entry represents the combined partition, with the delta file's shortname uniquely identifying the partition. The term "combined partition" refers to the root file+delta file pair, and the term "delta file" will be used to refer to the physical delta file. For the first update that modifies rows in a root micro-partition file, the root micro-partition file B is unregistered, and a combined partition D1(B) is registered. For a subsequent update on the same root file, the combined partition D1(B) is unregistered, and a new combined partition D2(B) with the delta file D2 is registered containing a cumulative delete bitset that includes the deleted rows from the previous DML and the current DML, which is illustrated in the example of FIG. 10.

The delta file's reference to its root micro-partition file is tracked in the delta file's file metadata section in the EP file that registers the combined partition. EPF2 in FIG. 10 includes all of B's metadata. During D1's file registration, the execution node sends B's shortname and compute service manager 108 looks up B's metadata internally.

The following relates to file metadata in an EP file.

A single entry with two full sets of file metadata for a combined partition registered in an EP file is provided, one set of metadata for the root file and one for the delta file itself. The full set of file metadata of the root file is needed in the EP file that registers the combined partition because once after EP file compaction, the original root file registration entry is removed from the new compact EP file, but the root file metadata is retained, which is needed for scanset construction, data retention/file lifecycle management, consistency checking, and the like.

- A delta file will have its own shortname, following the existing micro-partition file shortname format, unrelated to its root file.
- A delta file will potentially have a different volume and/or file master key id from its root file, following the same logic assigning volume/file master key id for a micro-partition file. In an implementation, the execution node assigns a file to a volume based on the file shortname hash.

The following relates to accurate EPs.

For a combined partition registration of root+delta file, the execution node will compute the accurate column EPs for all surviving rows from the root file—as if the rows had been generated by the copy-on-write mechanism—and send them to compute service manager 108 to register in an EP file.

The following relates to file registration.

For a delta file, the execution node will send its file metadata and column EPs to compute service manager 108 during the file registration request. The compute service manager 108 will register the delta file representing the combined partition the same way as a micro-partition file with file metadata and column eps in a delta EP file, where the root file's metadata is written into the delta EP file's file metadata section. Some metadata is omitted for the root file in a delta EP file, and is backfilled during compaction for a new compact EP file. The metadata to omit from a delta EP file is those not needed for foreground queries e.g., not cached in the EP cache. Those metadata are for background services, e.g., to perform file existence checks, which can run only on compact EP files in an example.

The following relates to file unregistration.

The previous file is unregistered and a new combined partition is registered reflecting the cumulative deleted rows and updated rows for the root file. The previous file can be either a root file or a combined partition, depending on whether a delta file is obtained from a delete/update in a previous DML on the same root file.

The following relates to retrieving the root file metadata during file registration using, for example, a scanset.

During scanset generation in compute service manager 108, the root file's metadata is retrieved from the EP cache and the metadata is saved in a hash table in the job context. When the execution node sends the registration request for the combined partition, the root file's metadata is retrieved in the specific compute service manager 108, regardless of whether the information is evicted in EP cache.

The following relates to scanset generation.

If a combined partition is included in the scanset, its root file's access information is included so that the execution node knows where to read the root file and how to decrypt it, and the like.

EpCache (e.g., cache for EP files) will be the layer to lookup the necessary root and delta file's metadata for a combined partition, and output the enhanced file entities to build the scanset. Combined partitions will be assigned to the execution node workers based on the assignment of their root file to improve cache efficiency.

The fileset is currently grouped by the data file's volume ID and file master key ID. With delta files, the delta file is included with its root file in the same fileset, but the delta file can have a different volume ID and/or file master key ID from its root file. Hence an array of volume IDs and file master key IDs for the root files can be provided. In an example, a space-efficient encoding of combined partition metadata is provided (e.g., when sending from a compute service manager to a given execution node).

The following relates to an EP-based scanset.

EpScan (e.g., scan operation for EP files) is utilized for non-DML queries and DML queries. Queries use EpScan when the scanset size is larger than a threshold number of files but it is appreciated that decreasing the threshold to a lower threshold number of files then the previous threshold number is possible. For the scanset in the execution node, it can include all the file metadata of the root file, and such metadata is sent along with the file registration request for the delta file.

The following relates to time travel. Time travel refers to a feature that allows users to access and query historical data at a specific point in time where it enables users to view, analyze, and even restore data as it existed at a previous moment.

From a metadata perspective, a combined partition registration entry represents a new partition that reflects the current state of the table. Customers can time travel back to a previous version by reading from EP files containing the partition consisting of the root file+delta file at that version.

The following relates to cloning.

Cloning will work the same way as it does today, by sharing EP files and data files (root+delta) with its source table. The compactor failsafe phase will account for the cloned tables when doing reference checking of both root files and delta files to ensure files referenced by cloned tables will not be deleted.

With respect to an EP file compactor, the compact phase works the same way as removing the unregistration entries from delta EP files and concatenating the delta EP files into compact EP files. When removing unregistration entries, currently all unregistered files are added to deleted EP files, which record the candidate files to be deleted in Failsafe phase. With delta files introduced, only an unregistered root file is added to deleted EP files when there is no active delta file from the current table referring to it.

An active delta file referring to a root file can be determined by reading all the delta EP files for the latest committed table version. This method works based on the assumption that the registration and unregistration of delta files pointing to the same root file will have the same dmlStartTime (e.g., DML start time), even though they can be written into different EP files. The following relates to failsafe file reference checking.

A root file can only be deleted once it's out of retention and there are no delta files (active+retention) referring to it. The compact phase does not add the root file to the candidate list of files to be deleted if there is an active delta file from the table itself referring to it. The failsafe phase accounts for cloning scenarios where the root file can be active, or having an active delta file referring to it in cloned tables. In a combined partition registration entry in an EP file, the delta file also has the root file's shortname that it refers to, so the failsafe code path accounts for the reference from the delta file.

For a delta file, reference checking is based on the delta file's shortname, similar to micro-partition files.

The following discussion relates to an execution node (e.g., execution node 112A-1, and the like), and particular operations that such an execution can perform with respect to embodiments of the subject technology. In particular, references to various operators or operations can be understood as being performed by the execution node (e.g., during query execution, and the like).

For a combined partition scan, at the bottom of a given query plan, an execution node performs a scan of the partition. The scan produces data rows together with a set of provenance columns including the physical row number in their file. The execution node also adds file access metadata columns for the root file if the scanned file is a delta file: BASE_VOL_ID, BASE_ENC_PREFIX, BASE_FILE_ID, BASE_FMK_ID. These columns can be utilized in the scanback operator to rescan the combined partition. In an example, a pseudocolumn is a column that is not physically stored in a table, appears as a regular column in queries, and is generated by DML engine 109 to provide additional information or functionality when querying data.

In an implementation, validation can be performed using a particular mode, where the particular mode determines techniques that are utilized (e.g., for determining that results from executing a query are correct, and which types of data or metadata that is generated for the purpose of validation). For regular query execution, the validation files and the validation mode does not have any effect. However, the validation service will run its own queries in the background, separate from customer queries. These queries will have a different plan shape but the gist is that they scan both the primary and validation partition. Depending on the mode, either the COW partition or the combined partition (root+delta) will be the primary and secondary or vice versa. In an example, a ROW_POS column (e.g., indicating row position) will include the physical row position in the file that is read from.

A subset of the plan of the DML statement includes joining of the source tables for MERGE statements, the filter to pass rows that are being deleted or updated and the projection to annotate rows with their route ID and insert flag. Newly inserted rows for MERGE statements will be split out to a separate insert operator (e.g., via insert funneling). An optional partitioning and sorting operator will partition rows by the file name and order rows by (row-offset), which is the same as the ROW_POS/row position column mentioned above, to make sure that all rows of a single file appear on a single worker in the order in which the scanback will process them.

With respect to a scanback operator (or "scanback operation"), before scanning a new partition back, the scanback operator will buffer input rows to be updated. If the number of rows exceeds a configurable threshold, the operator will decide to perform a copy-on-write operation for the current partition. In an example, memory utilization to buffer input rows can be relatively small at least because the buffer is cleared for each file and the scanback receives metadata (file_name, row_pos, vol_id, route_flag, and the like) and no actual table data.

The scanback operator will unregister the input partition. If the scanback operator encounters a delta file, then it will unregister the combined partition that represents the delta file.

For alignment, only for updated row(s) and CoW and new row(s), the scanback operator will open the input partition and send a START_OF_FILE signal containing the number of rows in the source file. The Insert operator will use this signal to decide whether to wait for the remaining rows or to finalize a file if its internal statistics indicate that the current file should be finalized but only a small number of rows are outstanding.

To open the file for scanning it back, the scanback operator will use the base and virtual provenance columns from the incoming row set. The partition scan will produce physical row numbers.

At the end of an input file, the scanback operator will send a flush signal. In particular, it will include the full metadata for the root file to include it in the registration request for the combined partition. The flush signal will be sent over the row-output-link of the scanback RSO.

Prior to an insert operator, rows flow through multiple branches of a MERGE statement to filter out deleted rows and apply updates. In an implementation, a first RSO is responsible for computing the bitset, and another separate RSO is responsible for computing the EPs for the partition, and a third RSO (e.g., an insert) for writing out the delta file, and registering the file with compute service manager 108.

For bitset computation, a bitset computation RSO will compute the bitset for the new delta file from the input rows. For each row that originated from the root file and which has not been modified by the DML statement, it will set the corresponding bit to 0. All other bits will be set to 1. It can determine whether a row has been updated by looking at whether a row passes through the RSO, and if the row is seen then such a row has not been deleted. Only unmodified rows will pass through the RSO.

With respect to EP computation, the EP computation operator will receive all rows including the CoW rows from the root file. This enables obtaining precise EPs for the combined partition represented by the root and delta files.

A file registration request for a combined partition will include the metadata of both root and delta files in the registration message. In an implementation, caching of the root file metadata in compute service manager 108 is performed, and referring to the file metadata in the registration message is performed (e.g., instead of sending the file metadata to the execution node in the SDL and then sending it back to compute service manager 108 during registration).

A CoW fallback provided in the execution node will support falling back to the old copy-on-write mechanism. At multiple points in the execution, it can be decided whether to fall back to CoW. In particular, the following cases (e.g., Case 1, Case 2, Case 3, Case 4, Case 5, and the like) can be supported:

1. The ratio of deleted rows in the final delta file over all rows in the source file exceeds a configurable threshold (e.g., 5%, and the like). In those cases, CoW would be cheaper than then writing a delta file, and subsequent reads would be faster, too.
2. The size of the source micro-partition file is smaller than a threshold: adding a bitmap will significantly degrade read performance.
3. The delta file would exceed the maximum file size allowed for the table. Because of a need to maintain a 1:1 mapping between source and delta files, a fallback to CoW is performed to write two new, smaller source files. Exceeding the file size limit by a small fraction can be allowed if only a small number of rows are outstanding.
4. Update is increasing row size (or overall micro-partition byte size) by more than a certain threshold. In such cases, the cost of copy-on-write is dwarfed by the cost of writing the new tuples.
5. The resulting file size for a CoW file is smaller than a configurable threshold. This could happen if a delete of a few large rows leads to a small residue. This can be detected by tentatively writing a CoW file and inspecting its size.

In view of the above, cases 1 and 2 can be decided by the scanback operator and will be more common than case 3. They will be handled by a particular insert operator using the START_OF_FILE signal before sending rows to it. Then, the insert operator will write all rows to the output file, including the CoW rows from the root file. Further, for MERGE statements, CoW rows are sent to the insert RSO which handles newly inserted rows.

Case 3 is understood to be alignment related, and may occur if the insert operator detects that the resulting file will exceed a configurable limit and the number of outstanding rows is too large to fit into the allowable size increase. This may happen when compression of a column degrades significantly. To handle it, the insert operator will flush the current file and not write its bitset. Once all updated rows have been written to multiple files, the insert operator will rescan the root file and apply the delete bitset. This will produce exactly the rows that are missing for a full copy-on-write step.

In an implementation, the following criterion can be utilized to determine whether CoW is performed:

1. Micro-partition criterion: checks whether a file is a micro-partition file and if the file is not of that type (e.g., when the file is of a different type such as Parquet, and the like), then CoW is performed
2. CoW decision override criterion: CoW is always performed irrespective of any other criterion or condition(s)
3. Size of root file criterion: determine whether root file is smaller than a particular size threshold, and if so, then CoW is performed
4. Age of root file criterion: determine whether root file is older than a threshold period of time (e.g., 12 months, and the like), and if so, then CoW is performed
5. Modified ratio criterion: discussed above in Case 1
6. Memory for computing NDV (number of distinct values) criterion: based on statistics in a given file, determine a number of distinct values for each column, then determine an estimate of memory that is required to compute all of the distinct values for each column based on a particular data type of that column (e.g., numerical, string, and the like). If the estimate of memory for every column is greater than a memory threshold (e.g., maximum allowed "memory budget" or amount of memory), then CoW is performed.
7. File version criterion: determine whether the version of a file is incompatible (e.g., less than a particular version), and if so, perform CoW. This is applicable for a file in an older version of the file format and, by performing CoW, the file is written in a newer version.

During data modification operations, the subject system determines potential changes to column min/max values through an efficient position-tracking mechanism that eliminates the need for full partition scans.

In existing database systems, a critical challenge arises when performing data modification operations while maintaining accurate column statistics. Traditional approaches require scanning and analyzing all remaining data after modifications, creating substantial performance overhead, particularly when modifying small portions of data across multiple partitions. This scanning requirement significantly impacts system performance, especially in scenarios where only a small percentage of rows are being modified but entire partitions must be reprocessed to validate statistical accuracy.

A typical requirement is recomputing statistics for columns after modifying data within partitions. When rows are deleted from a partition, statistics can be recomputed over the remaining rows to maintain accurate metadata. This recomputation process requires scanning and analyzing all remaining data, which creates significant performance overhead.

A challenge can arise when attempting to skip statistics recomputation while ensuring minimum and maximum values remain accurate. For example, in a partition containing values 1, 2, 3, 4, 5, deleting the value 2 would not affect the minimum (1) or maximum (5) values. However, deleting value 1 would change the minimum value. During DML operations that delete rows from a source partition, the subject system may only know values for columns involved in the deletion criteria, not all columns in the partition. Thus, loading and analyzing every column to determine statistical changes would be computationally expensive.

In view of the above, embodiments of the subject technology provide for optimizing data modification operations (e.g., DML, and the like) through efficient tracking and validation of statistical changes. The subject system stores min/max decisive positions in partition headers, indicating physical locations where minimum and maximum column values occur. During modification operations, the subject system determines whether statistics remain valid by comparing positions to be modified against stored positions, eliminating the need for full partition scans.

Figure 11:
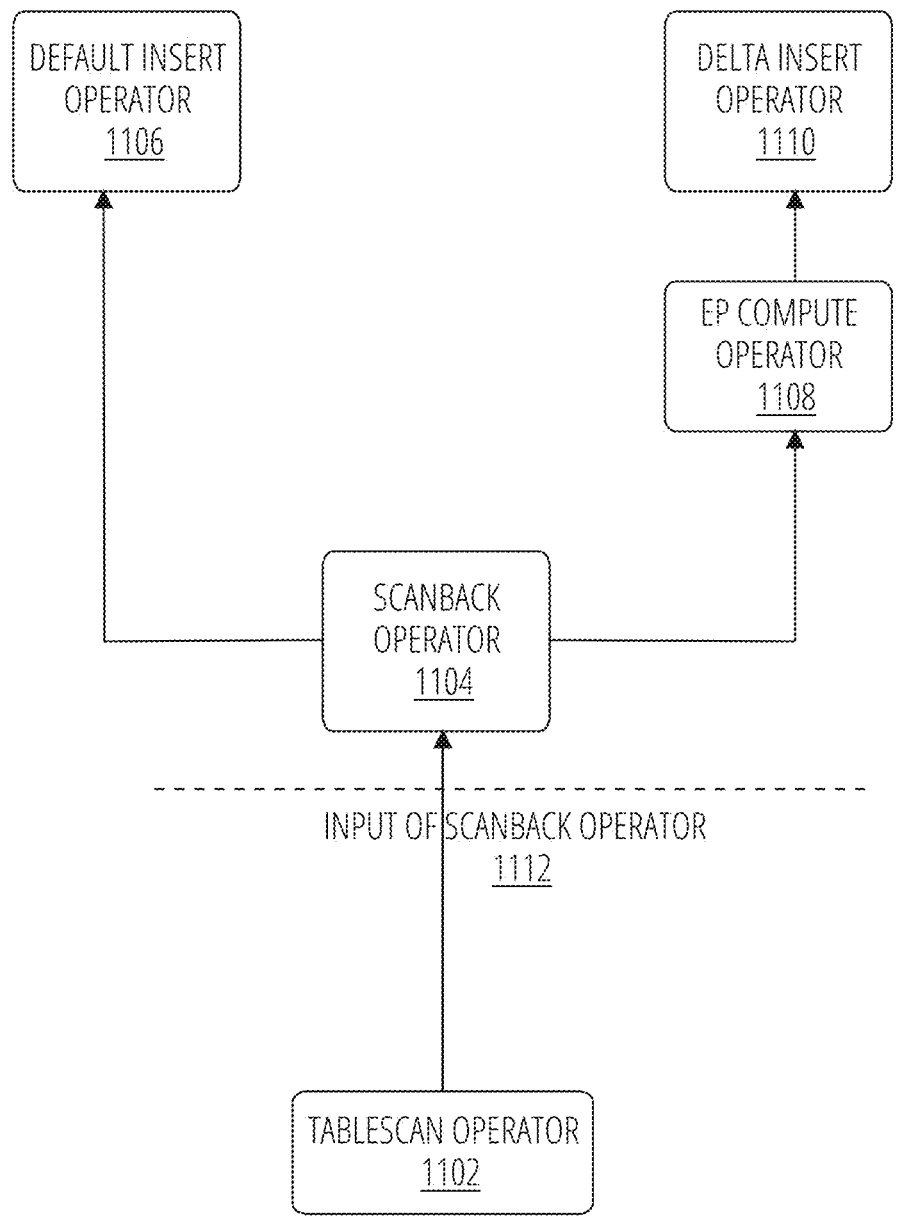
FIG. 11 illustrates an example of a processing flow for processing at least a portion of a query, in accordance with an embodiment of the subject technology.

FIG. 11 illustrates an example of a processing flow for processing at least a portion of a query, in accordance with an embodiment of the subject technology.

The subject system implements a hierarchical processing architecture that enables efficient data modification operations. The processing architecture includes three processing branches that handle different aspects of data modification.

As illustrated, an input processing layer includes a tablescan operator 1102 that performs initial data analysis by scanning the target table and identifying rows targeted for modification. This component outputs critical information including logical row positions within partitions, physical row positions within files, and file access information for both root and delta files. The tablescan operator 1102 selectively loads only columns required for filter evaluation, optimizing initial data access.

The architecture implements a central decision processing layer centered around the scanback operator 1104 and CoW decision logic. In an implementation, scanback operator 1104 receives deleted/updated row information, included in input of scanback operator 1112, and implements buffering mechanisms to accumulate sufficient data for processing decisions. The CoW decision logic analyzes partition characteristics, min/max decisive positions, and deletion ratios to determine the optimal processing path between the processing path for skipping partition scanning and avoiding statistics recomputation optimization, the processing path using delta files and bitsets processing, or Copy-on-Write operations.

In an implementation, the subject system determines a processing path corresponding to a particular processing branch. In the example of FIG. 11, a DEFAULT Insert branch including default insert operator 1106 handles newly inserted rows from merge operations and processes surviving rows when the processing path for skipping partition scanning and avoiding statistics recomputation or the processing path using delta files and bitsets optimizations cannot be applied (e.g., when a CoW processing path is performed instead as a fallback). This branch includes EP computation for statistical maintenance.

The DELTA Insert branch including delta insert operator 1110 specializes in creating combined partitions and processes surviving rows when the processing path using delta files and bitsets is applied. However, this branch processes no rows when the processing path for skipping partition scanning and avoiding statistics recomputation optimization is successfully applied.

The EP compute operator 1108 manages statistical computations, deriving essential EP information for registration and handling metadata updates. This ensures statistical accuracy while enabling optimization through selective computation.

As discussed further herein, the processing architecture performs metadata management that tracks min/max decisive positions, maintains column statistics, and manages combined partition creation. This enables efficient validation of statistical preservation without requiring full partition scans, while maintaining data accuracy through precise position tracking and validation.

In an implementation, the subject system stores additional metadata within each partition. This metadata, for example, includes a list of physical row positions that indicate where minimum and maximum values occur for each column. For each column in the partition, the metadata in an example includes:

One position indicating where a minimum value occurs

One position indicating where a maximum value occurs

While multiple positions may include minimum or maximum values for any given column, the subject system only has to track one occurrence of each. For example, the subject system creates a consolidated list of these positions across all columns, removing duplicate positions through deduplication, and stores this optimized list as partition metadata.

During DML operations, the subject system determines whether any positions in this metadata list will be modified. If the operation would modify any tracked position, the subject system avoids using the optimized DML approach since statistical values may change. However, if no tracked positions will be modified, the subject system can proceed with the optimized approach with mathematical certainty that minimum and maximum values remain unchanged across all columns.

This implementation enables efficient validation of statistical preservation without requiring full column scans or extensive data analysis, significantly improving performance for qualifying operations while maintaining data accuracy.

The techniques for determining min/max decisive row positions, as described further herein, provide an elegant solution to this challenge by implementing a precise metadata tracking system within partition headers. Instead of scanning entire partitions to determine if minimum or maximum values have changed, the subject system stores specific physical row positions that indicate where these values occur. For each column, the subject system tracks exactly one position containing a minimum value occurrence and one containing a maximum value occurrence. This targeted approach enables the subject system to determine whether statistical values remain valid by simply checking if any of these tracked positions are being modified, rather than processing all remaining data.

The min/max decisive row positions approach provides a deterministic method for validating statistical changes without requiring additional computation or data loading. This represents a significant improvement over other approaches that require extensive data processing to verify statistical modifications.

The approach described herein eliminates computational overhead by implementing a simple position comparison. Rather than loading and analyzing column data, the subject system determines whether any of the row positions targeted for deletion match the stored min/max decisive positions in the partition metadata. This comparison provides mathematical certainty about statistical preservation. For example, if no stored positions are being deleted, the minimum and maximum values are unchanged across all columns.

In an example, improved efficiency can be achieved through the implementation of a modified header format (e.g., based on a micro-partition header format), where a compact array of deduplicated row positions is stored alongside a version identifier. When processing DELETE, UPDATE, or MERGE operations, the subject system can immediately determine whether min/max statistics will remain valid by comparing the positions to be modified against these stored positions. If no overlap is detected, the subject system can skip expensive recomputation while maintaining mathematical certainty about statistical preservation. This approach can provide a significant performance improvement for delete operations compared to copy-onwrite approaches, while ensuring the accuracy of critical metadata statistics that are essential for query optimization and execution.

The subject system, therefore, implements an efficient mechanism for tracking and validating changes to minimum and maximum column values during data modification operations without requiring full partition scans and statistics recomputation. This is accomplished through strategic storage and management of decisive row positions that indicate where minimum and maximum values occur within partitions.

The following relates to computing min/max decisive row positions for statistical validation.

During data modification operations on partitions, the subject system implements a mechanism for determining potential changes to minimum and maximum column values without requiring examination of remaining partition data. This determination is important since minimum values may only change when all occurrences are deleted from a partition, with the same principle applying to maximum values.

In an implementation, the subject system (e.g., DML engine 109) extends a header format (e.g., based on a micro-partition header) to include a dedicated field including an array of physical row positions. These positions serve as indices within the physical file, with at most two positions stored per column after deduplication. For each column, the subject system maintains:
1. One physical row position indicating an arbitrary occurrence of the minimum value, and
2. One physical row position indicating an arbitrary occurrence of the maximum value.

After collecting these positions across all columns, the subject system deduplicates the list to optimize storage before writing to the header.

The storage format provides the following in an implementation:
A single-byte version identifier to support future format evolution
An array of deduplicated row positions
A total storage size bounded by 1+8*number_of_columns bytes When processing DML operations that delete or update rows from an input partition, the subject system evaluates two distinct scenarios for statistical validation:
1. In the first scenario, when the operation does not modify any min/max-decisive positions, the subject system can guarantee that minimum and maximum values remain unchanged across all columns in the remaining data. This enables optimized processing without requiring full data scans.
2. In the second scenario, if the operation modifies at least one min/max-decisive position, the subject system recognizes potential statistical changes. In this case, the subject system conservatively assumes statistical changes may occur and does not apply the optimization(s) for avoiding full partition scanning and statistics recomputation.

The subject system implements a hierarchical decision framework for determining the appropriate DML processing method for each partition. At the highest priority level, the subject system evaluates eligibility for skipping full partition scans and avoiding statistics recomputation by validating a series of required conditions. A critical condition in this evaluation is checking whether any min/max decisive positions would be modified by the operation.

When evaluating a partition for processing, if any condition is not satisfied, including the detection of modifications to min/max decisive positions, the subject system automatically proceeds to evaluate eligibility for processing using bitsets and delta files (e.g., as described before in previous figures above). This cascading evaluation ensures optimal processing path selection while maintaining statistical accuracy.

The integration of min/max decisive position validation represents an enhancement to the existing decision framework. While the underlying bitset and delta file processing remains unchanged from previous implementations, the addition of this new condition enables the subject system to make precise determinations about statistical preservation without requiring full data scans. This enhancement provides a new optimization path while maintaining compatibility with existing processing methods.

This structured approach ensures that each partition is processed using the most efficient method available while maintaining data integrity. In particular, the subject system first attempts to apply processing to avoid performing full partition scans and statistics recomputation, falls back to processing using bitsets and delta files when necessary, and ultimately defaults to CoW techniques if neither optimization path is viable.

The following discussion relates to operations performed prior to potentially performing CoW techniques.

The subject system implements a buffering mechanism for input rowsets prior to determining a processing pathway. This buffering ensures sufficient data availability for making informed decisions about processing paths and optimization strategies.

The subject system implements distinct processing approaches based on partition type:

For micro-partitions, the subject system performs selective header reading instead of full partition scanning. When processing a combined partition, the subject system reads only the delta file. During this process, the subject system extracts metadata including:
Number of Distinct Values (NDV)
Nullcount information for EP derivation
Min/max decisive row positions For Iceberg partitions, the subject system implements a more minimalist reading approach. The subject system only reads the delta file when processing combined partitions, eliminating unnecessary data access in other scenarios.

The subject system relies on a TableScan operation to provide essential partition information, specifically file size and rowcount data for the root data file, when source partition scanning is no longer utilized for retrieving fundamental partition characteristics.

The following discussion relates to a CoW decision.

The subject system implements a three-tiered decision framework for processing partition modifications. During initial processing, the subject system continues to buffer incoming rows until sufficient data is available to make an informed decision about the processing path.

The subject system first evaluates the processing path for skipping partition scanning and avoiding statistics recomputation eligibility through multiple validation steps. A fundamental requirement is maintaining a deletion ratio below 5%, which, although matching the processing path using delta files and bitsets threshold, is controlled through a separate parameter to enable independent tuning of the two optimization paths.

For partitions in the micro-partition format, the subject system can enforce additional requirements:
Verification that min/max decisive row positions are stored in the partition header Confirmation of column metadata presence in delta file headers for combined partitions Validation that no min/max decisive positions will be modified The subject system optimizes position validation by leveraging the low modification ratio, with at most 5% of rows being modified in an example, the overhead of checking position overlap remains minimal. Additionally, all requirements for processing using delta files and bitsets must be satisfied for eligibility for skipping partition scanning and statistics recomputation.

If the processing path for skipping partition scanning and avoiding statistics recomputation criteria is not met, the subject system evaluates the processing path using delta files and bitsets eligibility by validating all requirements for the processing path using delta files and bitsets. When neither the requirements for the processing path for skipping partition scanning and avoiding statistics recomputation nor the requirements for the processing path using delta files and bitsets criteria are satisfied, the subject system defaults to copy-on-write processing.

This hierarchical evaluation ensures optimal processing path selection while maintaining data accuracy and statistical preservation. The subject system progressively evaluates more permissive optimization approaches, ultimately falling back to baseline processing when necessary. The following relates to a processing path for micro-partitions.

When the processing path for skipping partition scanning and avoiding statistics recomputation is applied to micro-partitions, the subject system first analyzes column nullcounts from the parsed metadata to identify columns requiring null indicator validation. For columns requiring validation, the subject system performs targeted IO operations to retrieve specific compression blocks and extract null indicators. While this requires an additional IO round, the overhead is minimal compared to full column materialization and would be necessary for update operations.

The subject system maintains partition management by:
Unregistering the existing partition
Computing delete bitsets within Scanback
After collecting required metadata, the subject system packages:
Null indicators
Column metadata
Delete bitset
Min/max decisive row positions into a DIRECT_DML_FDN_PARTITION_WITH_DELETE_BITSET signal that propagates upward through the execution plan for processing by RsoDm-lEpCompute and DELTA Insert components.

The following relates to a processing path for Iceberg tables.

For Iceberg tables, the subject system implements a simplified signal flow, sending DIRECT_DML_ICEBERG_PARTITION_WITH_DELETE_BITSET containing the delete bitset.

This signal triggers:
Delta file creation
Positional delete file generation
Registration request submission without column EPs When the criteria for the processing path for skipping partition scanning and avoiding statistics recomputation are not met, the subject system maintains existing processing paths:
Evaluates the eligibility for the processing path using delta files and bitsets Falls back to copy-on-write when necessary (e.g., when the processing path using delta files and bitsets is ineligible)

The min/max decisive position approach, as described herein, represents a foundational approach that can be extended to virtually all column statistics maintained by the subject system. The subject system, therefore, can apply the same decisive position tracking to other statistical metrics or metadata. In an example, for maximum length statistics on binary or string columns, the subject system can store a single row position indicating where the maximum length value occurs. This enables the same validation approach, where if the stored position is not being modified, the maximum length statistic remains exact without requiring recomputation.

In another example, for pure ASCII statistics, the subject system can store one position containing a value that is not pure ASCII. By tracking this position, the subject system can avoid making the pure ASCII statistic inexact when modifications do not affect the stored position. This approach maintains statistical accuracy while preserving the performance benefits of skipping recomputation.

The extensibility of this approach demonstrates its broader applicability beyond min/max values. While implementations described herein focus on minimum and maximum statistics due to their high value in query optimization, the underlying methodology of tracking decisive positions can be applied to maintain exactness for various statistical metrics. A scalable framework is therefore provided for statistical preservation across different types of column metadata while maintaining the performance benefits of selective recomputation.

Figure 12:
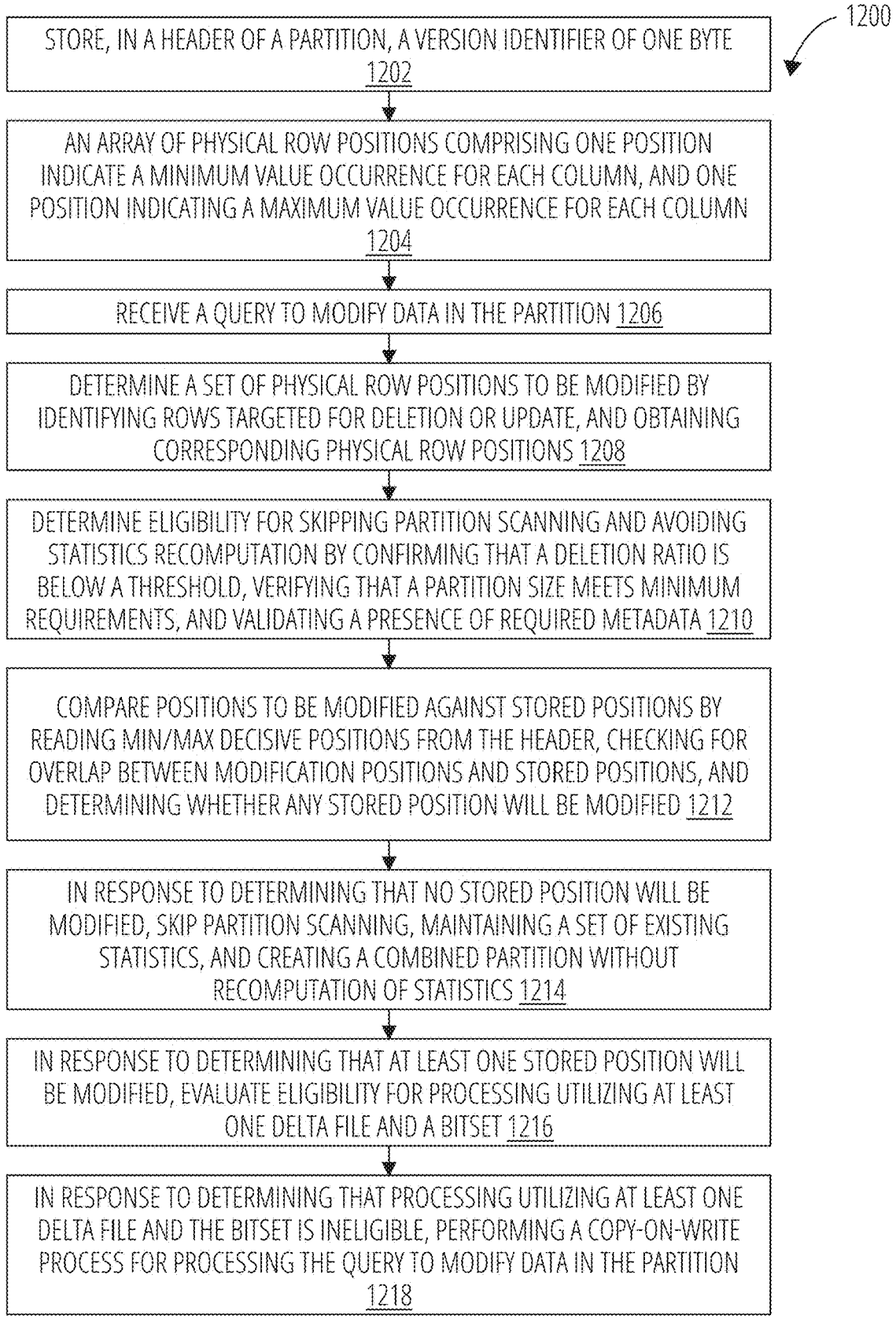
FIG. 12 is a flow diagram illustrating operations of a database system in performing a method, in accordance with some embodiments of the present disclosure.

FIG. 12 is a flow diagram illustrating operations of a database system in performing a method 1200, in accordance with some embodiments of the present disclosure. The method 1200 may be embodied in computer-readable instructions for execution by one or more hardware components (e.g., one or more processors) such that the operations of the method 1200 may be performed by components of data platform 102. Accordingly, the method 1200 is described below, by way of example with reference thereto. However, it shall be appreciated that method 1200 may be deployed on various other hardware configurations and is not intended to be limited to deployment within the data platform 102.

In operation 1202, DML engine 109 stores, in a partition header of a partition, a version identifier of one byte. In operation 1204, DML engine 109 an array of physical row positions comprising one position indicates a minimum value occurrence for each column, and one position indicating a maximum value occurrence for each column. In operation 1206, DML engine 109 receives a query to modify data in the partition. In operation 1208, DML engine 109 determines a set of physical row positions to be modified by identifying rows targeted for deletion or update, and obtaining corresponding physical row positions. In operation 1210, DML engine 109 determines eligibility for skipping partition scanning and avoiding statistics recomputation by confirming that a deletion ratio is below a threshold, verifying that a partition size meets minimum requirements, and validating a presence of required metadata. In operation 1212, DML engine 109 compares positions to be modified against stored positions by reading min/max decisive positions from the partition header, checking for overlap between modification positions and stored positions, and determining whether any stored position will be modified. In operation 1214, DML engine 109, in response to determining that no stored position will be modified, skips partition scanning if deleting rows (e.g., for delete queries), maintains a set of existing statistics, and creates a combined partition without recomputation of statistics. In operation 1216, DML engine 109, in response to determining that at least one stored position will be modified, evaluates eligibility for processing utilizing at least one delta file and a bitset. In operation 1218, DML engine 109, in response to determining that processing utilizing at least one delta file and the bitset is ineligible, performs a copy-on-write process for processing the query to modify data in the partition.

In an implementation, when creating combined partitions (e.g., in operation 1214 mentioned above), the subject system (e.g., DML engine 109) implements distinct approaches for managing min/max decisive positions based on the processing method applied:

Processing Path for Skipping Partition Scanning and Avoiding Statistics Recomputation When an optimization for skipping partition scanning and avoiding statistics recomputation is applied and statistics are not recomputed, the subject system preserves statistical accuracy by copying the existing min/max decisive positions from the input partition being modified. This copying process is valid because the decision framework for skipping partition scanning and avoiding statistics recomputation has already validated that none of the stored min/max decisive positions will be deleted or modified during the operation.

The subject system can safely reuse these positions because the eligibility criteria for skipping partition scanning and avoiding statistics recomputation specifically requires that no min/max decisive row positions are being deleted. Since the positions containing minimum and maximum values remain unchanged in the partition, the existing position metadata accurately reflects where these values occur in the resulting combined partition.

Processing Path for Processing Utilizing at Least One Delta File and a Bitset

When processing utilizing at least one delta file and a bitset is applied and statistics are recomputed, the subject system generates new min/max decisive positions during the statistics computation process. As the subject system computes updated minimum and maximum values for each column over the remaining data, it simultaneously tracks the physical row positions where these values occur.

During this recomputation, the subject system maintains the same position tracking methodology used during initial partition creation, recording one position for minimum value occurrence and one position for maximum value occurrence per column. These newly computed positions are then deduplicated and stored in the combined partition header using the same storage format.

This dual approach ensures that combined partitions maintain accurate min/max decisive position information regardless of the processing path selected, enabling future optimizations while preserving statistical accuracy.

Figure 13:
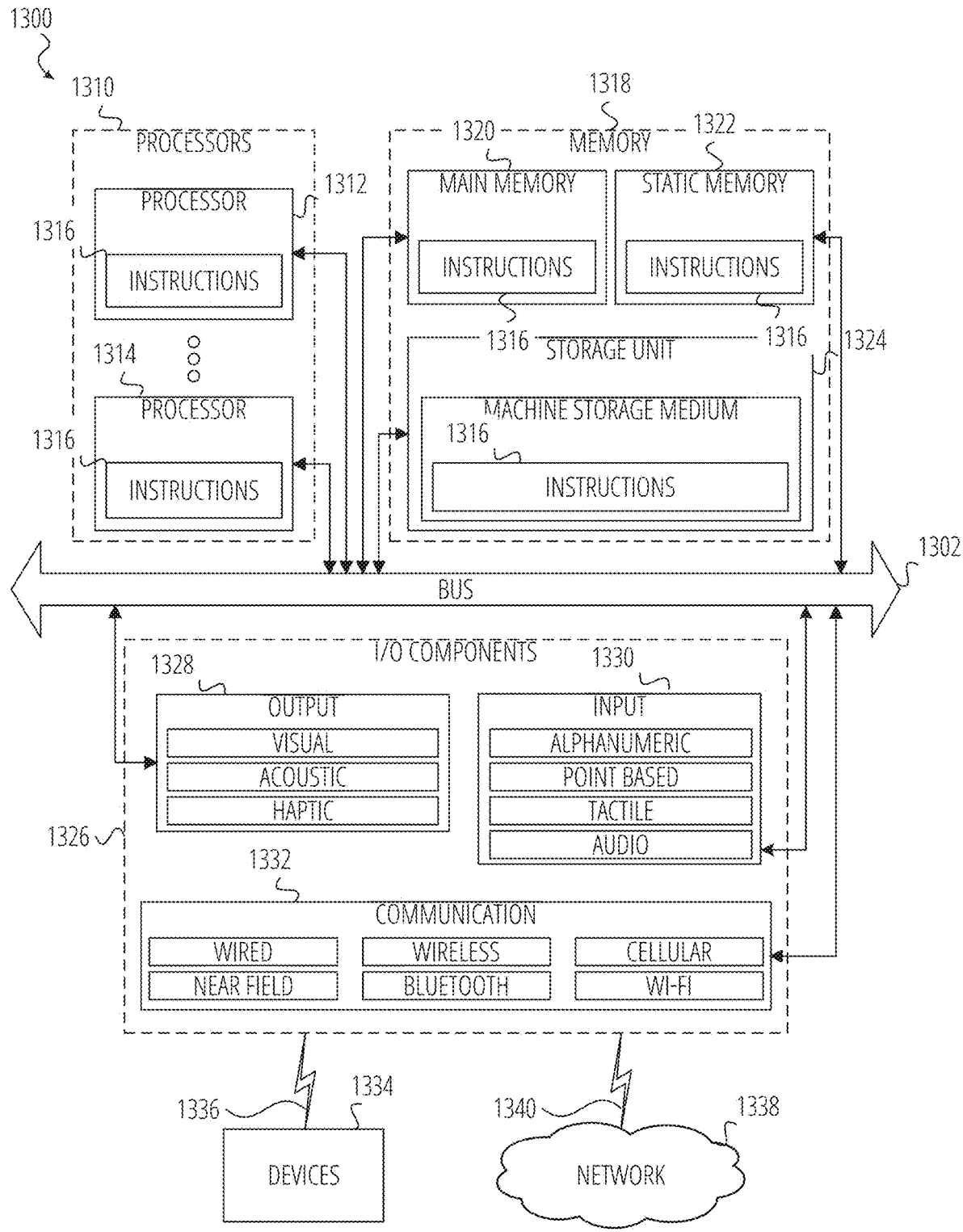
FIG. 13 illustrates a diagrammatic representation of a machine in the form of a computer system within which a set of instructions may be executed for causing the machine to perform any one or more of the methodologies discussed herein, in accordance with some embodiments of the present disclosure.

FIG. 13 illustrates a diagrammatic representation of a machine 1300 in the form of a computer system within which a set of instructions may be executed for causing the machine 1300 to perform any one or more of the methodologies discussed herein, according to an example embodiment. Specifically, FIG. 13 shows a diagrammatic representation of the 1800 in the example form of a computer system, within which instructions 1316 (e.g., a software, a program, an application, an applet, an app, or other executable code) for causing the machine 1300 to perform any one or more of the methodologies discussed herein may be executed. For example, the instructions 1316 may cause the machine 1300 to execute any one or more operations of the method(s) described before. As another example, the instructions 1316 may cause the machine 1300 to implement any one or more portions of the functionality illustrated in any one of at least some of the figures described herein. In this way, the instructions 1316 transform a general, non-programmed machine into a particular machine that is specially configured to carry out any one of the described and illustrated functions of the data platform 102 such as the compute service manager 108 (or a component thereof such as the DML engine 109) or an execution node of the execution platform 110.

In some embodiments, the machine 1300 operates as a standalone device or may be coupled (e.g., networked) to other machines. In a networked deployment, machine 1300 may operate in the capacity of a server machine or a client machine in a server-client network environment or as a peer machine in a peer-to-peer (or distributed) network environment. The machine 1300 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 includes processors 1310, memory 1318, and i/o components 1326 configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors 1310 that may comprise two or more independent processors (sometimes referred to as "cores") that may execute instructions 1316 contemporaneously. Although FIG. 13 shows multiple processors 1310, the machine 1300 may include a single processor with a single core, a single processor with multiple cores (e.g., a multi-core processor), multiple processors with a single core, multiple processors with multiple cores, or any combination thereof.

The memory 1318 may include a main memory 1320, a static memory 1322, and a storage unit 1324, all accessible to the processors 1310 such as via the bus 1302. The main memory 1320, the static memory 1322, and the storage unit 1324 store the instructions 1316 embodying any one or more of the methodologies or functions described herein. The instructions 1316 may also reside, completely or partially, within the main memory 1320, within the static memory 1322, within the storage unit 1324, within at least one of the processors 1310 (e.g., within the processor's cache memory), or any suitable combination thereof, during execution thereof by the machine 1300.

The i/o components 1326 include components to receive input, provide output, produce output, transmit information, exchange information, capture measurements, and so on. The specific i/o components 1326 that are included in a particular machine 1300 will depend on the type of machine. For example, portable machines such as mobile phones will likely include a touch input device or other such input mechanisms, while a headless server machine will likely not include such a touch input device. It will be appreciated that the i/o components 1326 may include many other components that are not shown in FIG. 13. The i/o components 1326 are grouped according to functionality merely for simplifying the following discussion and the grouping is in no way limiting. In various example embodiments, the i/o components 1326 may include output components 1328 and input components 1330. The output components 1328 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The i/o components 1326 may include communication components 1332 operable to couple the machine 1300 to a network 1338 or devices 1334 via a coupling 1340 and a coupling 1336, respectively. For example, the communication components 1332 may include a network interface component or another suitable device to interface with the network 1338. In further examples, the communication components 1332 may include wired communication components, wireless communication components, cellular communication components, and other communication components to provide communication via other modalities. The devices 1334 may be another machine or any of a wide variety of peripheral devices (e.g., a peripheral device coupled via a universal serial bus (USB)). For example, as noted above, the machine 1300 may correspond to any one of the compute service manager 108, the execution platform 110, and the devices 1334 may include the data store 206 or any other computing device described herein as being in communication with the data platform 102 or the data storage 104.

The various memories (e.g., memory 1318, main memory 1320, static memory 1322, and/or memory of the processor(s) processors 1310 and/or the storage unit 1324) may store one or more sets of instructions 1316 and data structures (e.g., software) embodying or utilized by any one or more of the methodologies or functions described herein. These instructions 1316, when executed by the processor(s) processors 1310, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 1338 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1338 or a portion of the network 1338 may include a wireless or cellular network, and the coupling 1340 may be a Code Division Multiple Access (CDMA) connection, a Global System for Mobile communications (GSM) connection, or another type of cellular or wireless coupling. In this example, the coupling 1340 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1316 may be transmitted or received over the network 1338 using a transmission medium via a network interface device (e.g., a network interface component included in the communication components 1332) and utilizing any one of a number of well-known transfer protocols (e.g., hypertext transfer protocol (HTTP)). Similarly, the instructions 1316 may be transmitted or received using a transmission medium via the coupling 1336 (e.g., a peer-to-peer coupling) to the devices 1334. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
    storing, in a header of a partition, a version identifier of one byte, and
    an array of physical row positions comprising one position indicating a minimum value occurrence for each column, and one position indicating a maximum value occurrence for each column;
    receiving a query to modify data in the partition;
    determining a set of physical row positions to be modified by identifying rows targeted for deletion or update, and obtaining corresponding physical row positions;
    determining eligibility for skipping partition scanning and avoiding statistics recomputation by confirming that a deletion ratio is below a threshold, verifying that a partition size meets minimum requirements, and validating a presence of required metadata;
    comparing positions to be modified against stored positions by reading min/max decisive positions from the header, checking for overlap between modification positions and stored positions, and determining whether any stored position will be modified;
    in response to determining that no stored position will be modified, skipping partition scanning, maintaining a set of existing statistics, and creating a combined partition without recomputation of statistics;
    in response to determining that at least one stored position will be modified, evaluating eligibility for processing utilizing at least one delta file and a bitset; and
    in response to determining that processing utilizing at least one delta file and the bitset is ineligible, perform a copy-on-write process for processing the query to modify data in the partition.

2. The method of claim 1, wherein storing the array comprises:
    deduplicating a set of positions that occur across multiple columns;
    storing positions as a list without delimiting; and
    storing deduplicated positions in a format bounded by a particular number of columns bytes.

3. The method of claim 1, wherein determining eligibility for skipping partition scanning and avoiding statistics recomputation further comprises:
    extracting a set of stored decisive positions; and
    validating position information before further processing the query to modify data in the partition.

4. The method of claim 1, wherein comparing positions to be modified comprises:
    reading stored min/max decisive positions during statistics computation;
    tracking physical row positions as minimum and maximum values are encountered; and
    maintaining position information without additional computational overhead.

5. The method of claim 1, wherein creating the combined partition comprises:
    copying a set of positions from the partition to be reutilized for the combined partition.

6. The method of claim 1, wherein maintaining existing statistics comprises:
    preserving minimum and maximum values across all columns of the partition.

7. The method of claim 1, further comprising:
buffering a set of input rowsets;
determining, using the buffered set of input rowsets, row information indicating a corresponding partition; and
identifying, using the row information, all rows from the partition to be processed as part of executing the query.

8. The method of claim 1, further comprising:
determining that the partition includes a set of min/max decisive positions in the header; and
verifying column metadata in a delta file header for a particular combined partition.

9. The method of claim 1, further comprising:
receiving row information from a table scan operator;
extracting, using the row information, a set of logical and physical row positions; and
obtaining file access information for root and delta files corresponding to a particular combined partition.

10. A system comprising:
at least one hardware processor; and
at least one memory storing instructions that cause the at least one hardware processor to perform operations comprising:
storing, in a header of a partition, a version identifier of one byte, and
an array of physical row positions comprising one position indicating a minimum value occurrence for each column, and one position indicating a maximum value occurrence for each column;
receiving a query to modify data in the partition;
determining a set of physical row positions to be modified by identifying rows targeted for deletion or update, and obtaining corresponding physical row positions;
determining eligibility for skipping partition scanning and avoiding statistics recomputation by confirming that a deletion ratio is below a threshold, verifying that a partition size meets minimum requirements, and validating a presence of required metadata;
comparing positions to be modified against stored positions by reading min/max decisive positions from the header, checking for overlap between modification positions and stored positions, and determining whether any stored position will be modified;
in response to determining that no stored position will be modified, skipping partition scanning, maintaining a set of existing statistics, and creating a combined partition without recomputation of statistics;
in response to determining that at least one stored position will be modified, evaluating eligibility for processing utilizing at least one delta file and a bitset; and
in response to determining that processing utilizing at least one delta file and the bitset is ineligible, perform a copy-on-write process for processing the query to modify data in the partition.

11. The system of claim 10, wherein storing the array comprises:
deduplicating a set of positions that occur across multiple columns;
storing positions as a list without delimiting; and
storing deduplicated positions in a format bounded by a particular number of columns bytes.

12. The system of claim 10, wherein determining eligibility for skipping partition scanning and avoiding statistics recomputation further comprises:
extracting a set of stored decisive positions; and
validating position information before further processing the query to modify data in the partition.

13. The system of claim 10, wherein comparing positions to be modified comprises:
reading stored min/max decisive positions during statistics computation;
tracking physical row positions as minimum and maximum values are encountered; and
maintaining position information without additional computational overhead.

14. The system of claim 10, wherein creating the combined partition comprises:
copying a set of positions from the partition to be reutilized for the combined partition.

15. The system of claim 10, wherein maintaining exist statistics comprises:
preserving minimum and maximum values across all columns of the partition.

16. The system of claim 10, wherein the operations further comprise:
buffering a set of input rowsets;
determining, using the buffered set of input rowsets, row information indicating a corresponding partition; and
identifying, using the row information, all rows from the partition to be processed as part of executing the query.

17. The system of claim 10, wherein the operations further comprise:
determining that the partition includes a set of min/max decisive positions in the header; and
verifying column metadata in a delta file header for a particular combined partition.

18. The system of claim 10, wherein the operations further comprise:
receiving row information from a table scan operator;
extracting, using the row information, a set of logical and physical row positions; and
obtaining file access information for root and delta files corresponding to a particular combined partition.

19. A non-transitory computer-storage medium comprising instructions that, when executed by one or more processors of a machine, configure the machine to perform operations comprising:
storing, in a partition header of a partition, a version identifier of one byte, and
an array of physical row positions comprising one position indicating a minimum value occurrence for each column, and one position indicating a maximum value occurrence for each column;
receiving a query to modify data in the partition;
determining a set of physical row positions to be modified by identifying rows targeted for deletion or update, and obtaining corresponding physical row positions;
determining eligibility for skipping partition scanning and avoiding statistics recomputation by confirming that a deletion ratio is below a threshold, verifying that a partition size meets minimum requirements, and validating a presence of required metadata;
comparing positions to be modified against stored positions by reading min/max decisive positions from the partition header, checking for overlap between modification positions and stored positions, and determining whether any stored position will be modified;
in response to determining that no stored position will be modified, skipping partition scanning, maintaining a set of existing statistics, and creating a combined partition without recomputation of statistics;
in response to determining that at least one stored position will be modified, evaluating eligibility for processing utilizing at least one delta file and a bitset; and in response to determining that processing utilizing at least one delta file and the bitset is ineligible, performing a copy-on-write process for processing the query to modify data in the partition.

20. The non-transitory computer-storage medium of claim 19, wherein storing the array comprises:
deduplicating a set of positions that occur across multiple columns;
maintaining associations between positions and corresponding columns; and
storing deduplicated positions in a format bounded by a particular number of columns bytes.

* * * * *